(12) United States Patent
Hardy et al.

(10) Patent No.: US 12,368,912 B2
(45) Date of Patent: *Jul. 22, 2025

(54) SYSTEM AND METHOD FOR GEOGRAPHICALLY ASSOCIATED OR GEOGRAPHICALLY DISASSOCIATED ENTICING GIFT OR VIDEO DROP

(71) Applicant: GIFTDROP LLC, Portland, OR (US)

(72) Inventors: Brian Hardy, Portland, OR (US); Norman Hardy, Portland, OR (US)

(73) Assignee: GIFT DROP LLC, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/633,358

(22) Filed: Apr. 11, 2024

(65) Prior Publication Data

US 2024/0259620 A1 Aug. 1, 2024

Related U.S. Application Data

(63) Continuation of application No. 17/949,634, filed on Sep. 21, 2022, now Pat. No. 11,985,370, which is a continuation-in-part of application No. 17/325,510, filed on May 20, 2021, now Pat. No. 11,483,605, which is a continuation of application No.
(Continued)

(51) Int. Cl.
| | |
|---|---|
| H04N 21/258 | (2011.01) |
| G06Q 30/0601 | (2023.01) |
| H04N 21/226 | (2011.01) |
| H04N 21/239 | (2011.01) |
| H04N 21/2743 | (2011.01) |
| H04N 21/414 | (2011.01) |
| H04N 21/472 | (2011.01) |
| G06F 3/04883 | (2022.01) |

(52) U.S. Cl.
CPC ... *H04N 21/25841* (2013.01); *G06Q 30/0601* (2013.01); *H04N 21/226* (2013.01); *H04N 21/2396* (2013.01); *H04N 21/2743* (2013.01); *H04N 21/41407* (2013.01); *H04N 21/472* (2013.01); *G06F 3/04883* (2013.01)

(58) Field of Classification Search
None
See application file for complete search history.

(56) References Cited

U.S. PATENT DOCUMENTS

| | | | | |
|---|---|---|---|---|
| 2009/0186694 A1* | 7/2009 | Gunawardana | ......... | A63F 13/45 463/31 |
| 2011/0313874 A1* | 12/2011 | Hardie | ................ | G06Q 20/306 705/26.1 |

* cited by examiner

*Primary Examiner* — Omar S Parra
(74) *Attorney, Agent, or Firm* — Renaissance IP Law Group, LLP; David A. Crowther

(57) ABSTRACT

This application pertains to gift-giving and video-dropping methods and systems. A gift drop or a video drop is facilitated using a mobile smart device and an interactive map. The system includes a gift or video drop database stored in a remote gift drop computer server. The system includes a gift or video drop logic section operable on a smart mobile device or a computer. The gift or video drop logic section includes an interactive gift or video drop map. The gift or video drop logic section presents the interactive gift or video drop map to a user, and facilitates the dropping of a symbolic gift item or a video onto the interactive map. The gift or video drop logic section determines whether the user is within certain predefined geographic boundaries, and either makes visible or gives a symbolic gift item to the user based on their location, or plays the video.

19 Claims, 10 Drawing Sheets

Related U.S. Application Data

16/802,469, filed on Feb. 26, 2020, now Pat. No. 11,025,974, which is a continuation of application No. 16/135,361, filed on Sep. 19, 2018, now Pat. No. 10,616,629.

(60) Provisional application No. 62/560,801, filed on Sep. 20, 2017.

SYSTEM AND METHOD FOR GEOGRAPHICALLY ASSOCIATED OR GEOGRAPHICALLY DISASSOCIATED ENTICING GIFT OR VIDEO DROP

RELATED APPLICATION DATA

This application is a continuation of U.S. patent application Ser. No. 17/949,634, filed on Sep. 21, 2022, which is a continuation-in-part of U.S. patent application Ser. No. 17/325,510, filed on May 20, 2021, which is a continuation of U.S. patent application Ser. No. 16/802,469, filed on Feb. 26, 2020, now U.S. Pat. No. 11,025,974, which is a continuation of U.S. patent application Ser. No. 16/135,361, filed on Sep. 19, 2018, now U.S. Pat. No. 10,616,629, which claims the benefit of U.S. Provisional Patent Application Ser. No. 62/560,801, filed on Sep. 20, 2017, which are hereby incorporated by reference.

TECHNICAL FIELD

This application pertains to gift-giving and video-dropping methods and systems, and more particularly, to a system and method for facilitating a gift drop or a video drop using a mobile smart device and an interactive drop map.

BACKGROUND

Gift-giving is a noble and selfless action. Humans have been giving gifts for thousands of years. Traditionally, gifts have been made in person, with one human physically handing a gift to another. With the advent of the Internet, gifts can now be made electronically. For example, a charitable contribution can be made using a credit card to organizations such as the American Red Cross®, United Way®, or other charitable organizations. By way of another example, money can be sent directly from one person to another using an online application such as Paypal®. However, anonymous gift-giving is presently difficult via the Internet. And there is currently very little enticement for people to give gifts, whether anonymously or otherwise, over the Internet. It is also presently difficult to associate videos with geographic locations in order to enhance an interactive map.

Accordingly, a need remains for improved methods and systems for providing an enticing and fun way to give gifts over the Internet, and for dropping videos on an interactive map. Embodiments of the inventive concept address these and other limitations in the prior art.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first interactive map could be termed a second interactive map, and, similarly, a second interactive map could be termed a first interactive map, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
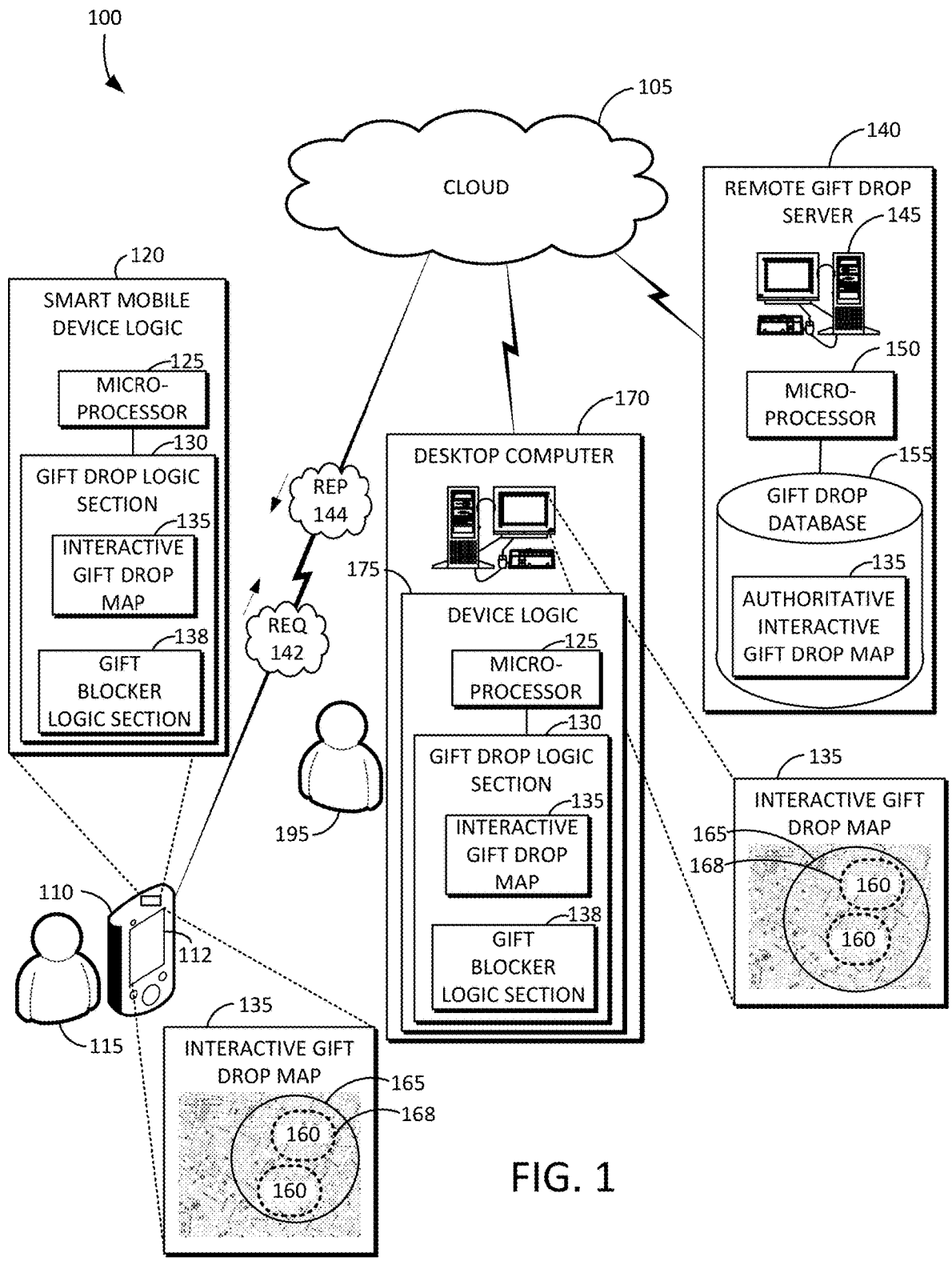
FIG. 1 illustrates a block diagram of an example system including a smart mobile device having a gift drop logic section, a desktop computer having a gift drop logic section, and a remote gift drop server in accordance with various embodiments of the present inventive concept.

FIG. 1 illustrates a block diagram of an example system 100 including a smart mobile device 110 having a gift drop logic section 130, a desktop computer 170 having a gift drop logic section 130, and a remote gift drop server 140 in accordance with various embodiments of the present inventive concept.

The system 100 includes a smart mobile device 110, which can be used by a user 115. The user 115 can be a private individual or a representative of a business. The smart mobile device 110 can be, for example, a smart phone, a smart tablet, a laptop computer, or the like. The smart mobile device 110 can include a touch-sensitive display 112. The smart mobile device 110 can include smart mobile device logic 120. The smart mobile device logic 120 can include a microprocessor 125. Moreover, the smart mobile device logic 120 can include a gift drop logic section 130. The gift drop logic section 130 can be controlled by or otherwise executed by the microprocessor 125. The gift drop logic section 130 can include an interactive gift drop map 135, as described in further detail below. The gift drop logic section 130 can also include a gift blocker logic section 138, which is also described in further detail below.

The system 100 can further include a desktop computer 170, which can be used by a user 195. The user 195 can be a private individual or a representative of a business. The desktop computer 170 can be, for example, a personal computer, a workstation computer, a server, or the like. The desktop computer 170 can include device logic 175. The device logic 175 can include a microprocessor 190. Moreover, the device logic 175 of the desktop computer 170 can include a gift drop logic section 130. The gift drop logic section 130 can be controlled by or otherwise executed by the microprocessor 190. The gift drop logic section 130 can include an interactive gift drop map 135, as described in further detail below. The system 100 can further include a remote gift drop server 140. The smart mobile device 110 can be communicatively coupled to the remote gift drop server 140 via the cloud 105. The remote gift drop server 140 can include, for example, a computer server 145. The remote gift drop server 140 can include a microprocessor 150 and a gift drop database 155, as also described in further detail below.

The system 100 facilitates the digital placement of gifts and things, hereinafter referred to as symbolic gift items 160, having monetary value on the interactive gift drop map 135. For example, the symbolic gift items 160 can include gift cards, coupons, promotional things of value, cash, virtual cash, virtual tokens, crypto tokens, or the like. After being placed on the interactive gift drop map 135, the symbolic gift items 160 can visibly appear at particular geographic locations on the interactive gift drop map 135. Alternatively, the symbolic gift items 160 need not visibly appear on the interactive gift drop map 135, but can nevertheless be present but in a hidden state at particular geographic locations on the interactive gift drop map 135.

The symbolic gift items 160 can be dropped onto the interactive gift drop map 135. For example, a user may select an icon representing a symbolic gift item 160, and with a finger gesture, swipe along the touch-sensitive display 112 of the smart mobile device 110 until the finger is pointing at a place on the interactive gift drop map 135 that corresponds to the location to which the symbolic gift item 160 should be geographically positioned on the map. By lifting the finger, the symbolic gift item 160 can be associated with that position, thereby completing the gift drop. Using the desktop computer 170, a similar gift drop procedure can be carried out using a mouse (not shown) instead of a finger.

Any user (e.g., 115, 195, etc.) can inspect the interactive gift drop map 135 and discern the presence of the visible symbolic gift items 160. In some embodiments, a particular symbolic gift item 160 can be made visible to the user 115 only if the user 115 is within a first predefined geographic boundary 165, but otherwise, the particular symbolic gift item 160 can be hidden from view. In some embodiments, the particular symbolic gift item 160 can be made visible to the user 115 even if the user 115 is outside of the first predefined geographic boundary 165. The user 115 can claim the visible symbolic gift items 160 by selecting them on the interactive gift drop map 135 as long as the user 115 is physically within a second predefined geographic boundary 168. The first predefined geographic boundary 165 is larger than the second predefined geographic boundary 168. For example, the first predefined geographic boundary 165 can have a three (3) mile diameter, while the second predefined geographic boundary 168 can have a fifty (50) foot diameter. Each of the first and second geographic boundaries (165 and 168) can have a shape of a circle, an oval, a square, a rectangle, a triangle, any suitable shape, or the like.

The location of the symbolic gift item 160 can be geographically disassociated with the location of the person or business responsible for dropping the symbolic gift item 160 onto the interactive gift drop map 135. Accordingly, the gift drops can be anonymous, or otherwise geographically disassociated with the gift giver. For example, a business need not drop gifts at the actual physical location of the business. Rather, a business can drop gifts at ball parks, special events, symposiums, competing locations, or the like.

Alternatively, the location of the symbolic gift item 160 can be geographically associated with the location of the person or business responsible for dropping the symbolic gift item 160 onto the interactive gift drop map 135. Accordingly, the gift drops need not be anonymous, and can be geographically associated with the gift giver. For example, a business can drop gifts at the actual physical location of the business.

The gift drop logic section 130 of either or both of the smart mobile device logic 120 and the device logic 175 can transmit a request 142 to the remote gift drop server 140. The request 142 can include, for example, a request to drop one or more symbolic gift items 160 on to the interactive gift drop map. Alternatively, the request 142 can include, for example, a request to create a gift blocker, which is discussed in further detail below. The remote gift drop server 140 can transmit a reply 144 to the request 142. The reply 144 can include, for example, a confirmation or denial of the requested action.

The visible gift drop items 160 within the first predefined geographic boundary 165 can be filtered. In other words, if the user 115 wants to limit the quantity or type of gift drop items 160 that are visible on the interactive gift drop map 135, then the user 115 can specify criteria for limiting the display of the visible gift drop items 160. For example, a user may specify that only automotive related gift items be made visible, or that only food related gift items be made visible, and so forth. The gift drop logic section 130 can filter the visible gift drop items 160 responsive to the user's preferences.

By way of another example, a user (e.g., 115, 195, etc.) may drop one or more symbolic gift items 160 near an underpass of a highway where it is common for homeless individuals to congregate, thereby directly uplifting the lives of others that are in potentially destitute situations. By way of another example, a user (e.g., 115, 195, etc.) may drop one or more symbolic gift items 160 in an area recently devastated by a natural disaster such as a hurricane or earthquake, thereby bringing relief to others in need.

A symbolic gift item 160 can be moved from one particular location on the interactive gift drop map 135 to another particular location by the user who originally placed the symbolic gift item 160. In some embodiments, the user who originally placed the symbolic gift item 160 can select an option to have the symbolic gift item 160 automatically moved from one particular location on the interactive gift drop map 135 to another particular location after a certain waiting period. In some embodiments, the user who originally placed the symbolic gift item 160 can select an option to have the symbolic gift item 160 gradually automatically moved over a predefined period of time from one particular location on the interactive gift drop map 135 to another particular location.

In some embodiments, a user (e.g., 195) working on behalf of a business can create an advertising or promotional campaign. For example, a business can setup a promotion such as placing symbolic gift items 160 at various geographic locations throughout the globe, a city, or even a neighborhood. An existing or new coffee shop can, for example, target a business park and place free large coffee offers throughout the park. A company such as a vehicle manufacturer or dealer can advertise a promotion where they drop or place a new vehicle free of charge at a certain venue at a certain time to promote their product. Users of the interactive gift drop map 135 that are located in the crowd will get a notification if they are the user closest to the virtual drop, and can claim the prize simply by accepting the prize or offer.

All kinds of offers including gift cards, merchandise, food, clothes, shoes, etc., can be gifted at no charge to the recipient. The gift drop logic section 130 may charge the company creating the campaign a fee per virtual gift drop, but the end user receives the symbolic gift item 160 for free. Upon opening the gift, a video associated with the gift can be launched and played for the user. The video can include instructions on how to use or trade the symbolic gift item 160, or include other content such as an encouragement to continue searching for other near-by gifts.

The individual end user (e.g., 115, 195, etc.) can trade symbolic gift items 160 with other individual end users. The individual end users 115 can be limited in distance as to how far away they can see the symbolic gift items 160 and where they are placed. For example, the symbolic gift items 160 can be made visible to the user 115 when the user 115 is physically located within the predefined geographic boundary 165. The predefined geographic boundary 165 can be circular and have a 3 mile diameter, for example. It will be understood that other geographic boundaries and shapes can be used, such as squares, triangles, or rectangles.

In some embodiments, individual end users 115 can place symbolic gift items 160 on the interactive gift drop map 135 anywhere they would like. For example, an individual end user 115 can place one or more symbolic gift items 160 at a homeless shelter in their hometown, or anywhere in the world. In the event of a natural disaster in a particular place, an individual end user 115 can place one or more symbolic gift items 160 in towns or neighborhoods affected by the disaster.

In some embodiments, individual end users 115 can send symbolic gift items 160 directly to another person by sending them a link either publicly or anonymously. Individual end users can track all of their transactions via a user interface provided by the gift drop logic section 130 through a display of the smart mobile device 110. In some embodiments, end users 115 can donate symbolic gift items 160 directly to non-profit organizations, either publicly or anonymously. The gift drop logic section 130 can provide a list of non-profit organizations to which the end user 115 can donate their symbolic gift items 160. The system 100 facilitates the digital placement of symbolic gift items 160 having real monetary value to one or more points on the interactive gift drop map 135 with no height restriction.

In some embodiments, the system 100 can include a gift drop database 155 stored in a remote gift drop computer server 140. The gift drop database 155 can include an authoritative copy of an interactive gift drop map 135. The system 100 can include a gift drop logic section 130 operable on a smart mobile device 110. The gift drop logic section 130 can include the interactive gift drop map 135. The gift drop logic section can be configured to present the interactive gift drop map 135 to the user 115 of the smart mobile device 110. The gift drop logic section can be configured to detect a gesture from the user 115 on a touch-sensitive display 112 of the smart mobile device 110. The gesture can be, for example, a touch gesture using a finger, a swipe gesture using a finger, a touch-hold-and-move gesture using a finger, a touch gesture using a stylus, a swipe gesture using a stylus, a touch-hold-and-move gesture using a stylus, or the like.

Responsive to the gesture, the gift drop logic section can be configured to transmit a request 142 to the remote gift drop computer server 140 via the cloud 105 to drop a symbolic gift item 160 onto the authoritative copy of the interactive gift drop map 135. The gift drop logic section 130 can be configured to receive a reply 144 from the remote gift drop computer server 140 via the cloud 105. Responsive to the reply 144 being a confirmation indicating that the symbolic gift item 160 has been placed onto the authoritative copy of the interactive gift drop map 135, the gift drop logic section 130 can be configured to drop the symbolic gift item 160 onto the interactive gift drop map 135 presented to the user 115 of the smart mobile device 110. Conversely, responsive to the reply 144 being a denial of the request to drop the symbolic gift item 160 onto the interactive gift drop map 135, the gift drop logic section 130 can be configured to not drop the symbolic gift item 160 onto the interactive gift drop map 135 presented to the user 115 of the smart mobile device 110.

In some embodiments, the gift drop logic section 130 is further configured to receive a request from a user (e.g., 115) to claim the symbolic gift item 160. The gift drop logic section 130 can determine whether the user 115 is inside of a second predefined geographic boundary 168. Responsive to determining that the user 115 is inside of the second predefined geographic boundary 168, the gift drop logic section 130 can gift the symbolic gift item 160 to the user 115. In some embodiments, the gift drop logic section 130 can cause a video associated with the symbolic gift item 160 to be launched and played for the user.

Figure 2:
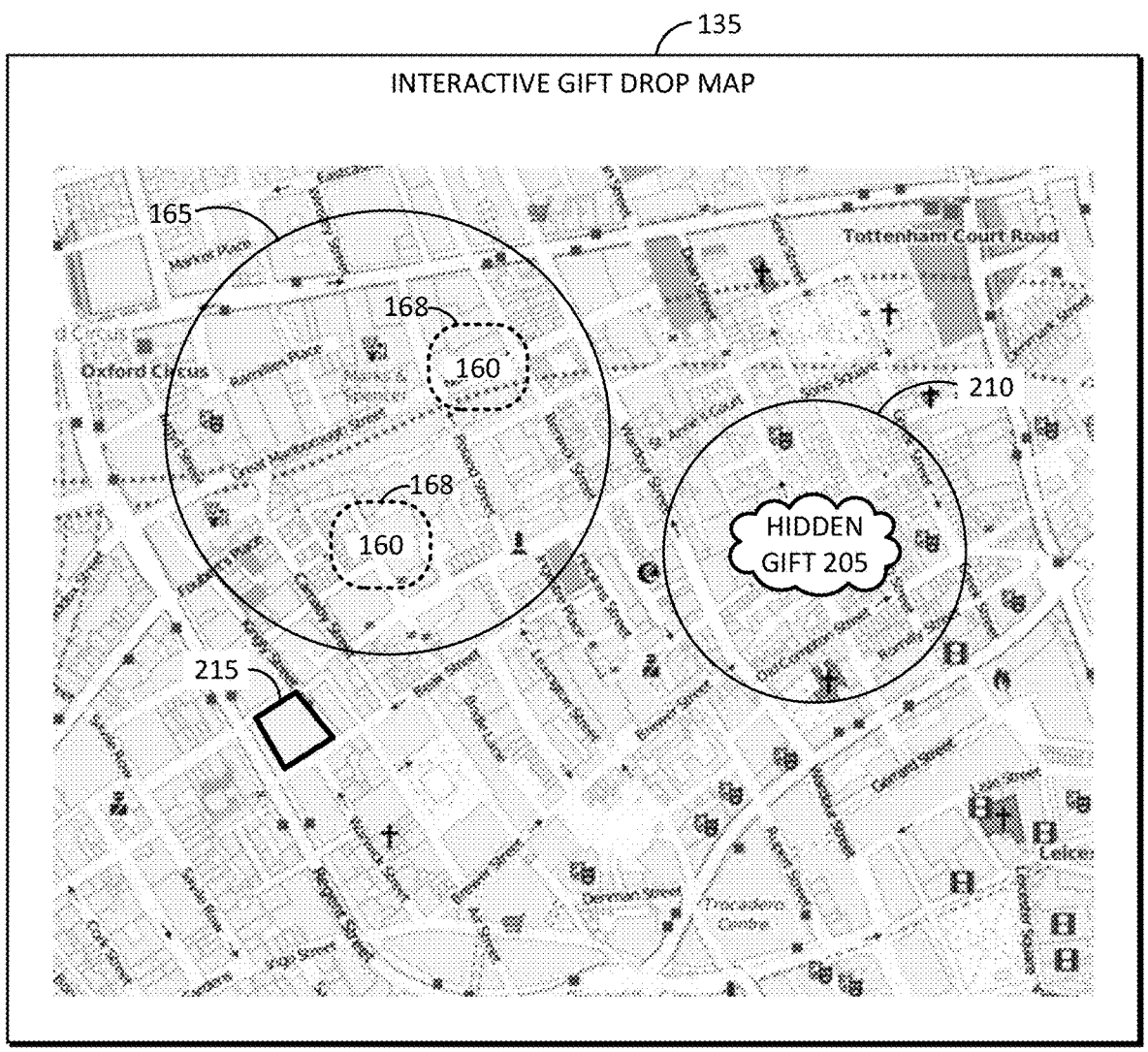
FIG. 2 illustrates a diagram of an interactive gift drop map in accordance with various embodiments of the present inventive concept.

FIG. 2 illustrates a diagram of an interactive gift drop map 135 in accordance with various embodiments of the present inventive concept.

In some embodiments, one or more hidden gifts 205 can be hidden on the interactive gift drop map 135 and are not initially made publicly visible. The hidden gifts 205 are not visible to the user 115. However, if the user 115 gets within a predefined proximity 210 of the hidden gift 205, then the user 115 can automatically be gifted the hidden gift 205. This can create a jubilant feeling in the user 115 for having found the hidden gift 205. The hidden gift 205 can be cash or a cash equivalent such as a virtual token that can be redeemed for cash. By way of another example, the hidden gift 205 can be non-fungible token (NFT), which can operate in association with a blockchain.

By way of yet another example, the virtual token can be a decentralized token such as an Ethereum® token, which can be traded on a decentralized exchange. By way of another example, the virtual token can be a cryptocurrency such as bitcoin. By way of yet another example, the virtual token can be a centralized virtual token. The predefined proximity 210 can be set by the user or business who dropped the hidden gift 205 onto the interactive gift drop map 135. The predefined proximity 210 can be circular, square, rectangle, or any suitable shape. The predefined proximity 210 can be of any suitable geographic size and area.

The gift drop logic section 130 can include a gift blocker logic section 138. The gift blocker logic section 138 permits a business to purchase a geographic gift blocker 215, which can block a competitor from dropping symbolic gift items 160 on their physical location. In other words, if the geographic gift blocker 215 is purchased, then the gift blocker logic section 138 causes all other users (e.g., 115) to be prevented from dropping symbolic gift items 160 or hidden gifts 205 within the geographic gift blocker 215. Accordingly, a business who purchases the geographic gift blocker 215 can prevent its competitors from interfering with its business or otherwise stealing its customers. In some embodiments, only persons who own or rent a particular physical location can purchase the geographic gift blocker 215 for that location.

For example, the gift drop logic section 130 can receive a request from a user (e.g., 115) to place a geographic gift blocker 215 onto the interactive gift drop map 135. The gift drop logic section 130 can transmit a request 142 to the remote gift drop computer server 140 via the cloud 105 to place the geographic gift blocker 215 onto the authoritative copy of the interactive gift drop map 135. The gift drop logic section 130 can receive a reply 144 from the remote gift drop computer server 140 via the cloud 105.

Responsive to the reply 144 being a confirmation indicating that the geographic gift blocker 215 has been placed onto the authoritative copy of the interactive gift drop map 135, the gift drop logic section 130 can place the geographic gift blocker 215 onto the interactive gift drop map 135 presented on the smart mobile device 110. Conversely, responsive to the reply 144 being a denial of the request 142 to place the geographic gift blocker 215 onto the interactive gift drop map 135, the gift drop logic section 130 can be configured to not place the geographic gift blocker 215 onto the interactive gift drop map 135 presented on the smart mobile device 110.

In some embodiments, the gift drop logic section 130 is further configured to transmit a second request 142 to the remote gift drop computer server 140 via the cloud 105 to drop a second symbolic gift item 160 onto the authoritative copy of the interactive gift drop map 135. The gift drop logic section 130 can receive a reply 144 from the remote gift drop computer server via the cloud. Responsive to the reply 144 being a denial indicating that the symbolic gift item 160 has not been placed onto the authoritative copy of the interactive gift drop map 135 due to an overlap with the geographic gift blocker 215, the gift drop logic section 130 can be configured to not drop the symbolic gift item 160 onto the interactive gift drop map 135 presented on the smart mobile device 110.

In some embodiments, the gift drop logic section 130 is further configured to make the symbolic gift item 160 hidden to a user (e.g., 115) when the user is outside of the first predefined geographic boundary 165. In some embodiments, the gift drop logic section 130 is further configured to make the symbolic gift item 160 visible to the user 115 when the user 115 is inside of the first predefined geographic boundary 165.

Figure 3:
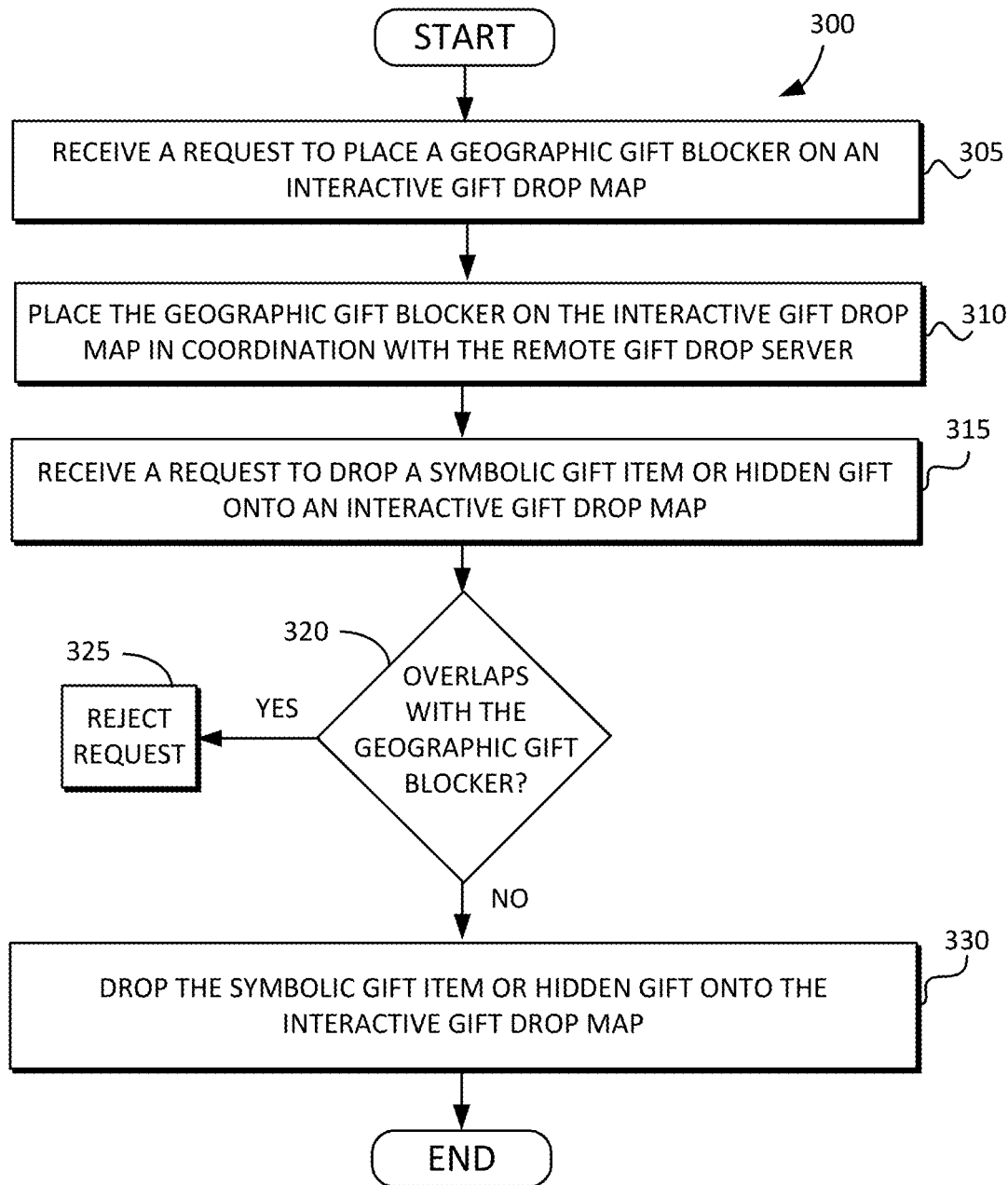
FIG. 3 is a flow diagram illustrating a technique for enforcing fairness of the interactive gift drop map in accordance with various embodiments of the present inventive concept.

FIG. 3 is a flow diagram 300 illustrating a technique for enforcing fairness of the interactive gift drop map 135 in accordance with various embodiments of the present inventive concept. The technique can begin at 305 where the gift drop logic section 130 receives a request from a user (e.g., 115, 195, etc.) to place a geographic gift blocker 215 on the interactive gift drop map 135. At 310, the gift blocker logic section 138 of the gift drop logic section 130 can place the geographic gift blocker 215 on the interactive gift drop map 135 in coordination with the remote gift drop server 140. For example, the gift blocker logic section 138 of the gift drop logic section 130 can transmit a request 142 to the remote gift drop server 140 to place the geographic gift blocker 215 at a particular geographic location corresponding to a physical location, building, etc. The remote gift drop server 140 can transmit a reply 144 that can include a confirmation indicating that the geographic gift blocker 215 has been placed, or a denial indicating that the geographic gift blocker 215 has not been placed.

At 315, the gift drop logic section 130 receives a request from a different user (e.g., 115, 195, etc.) to place one or more symbolic gift items 160 or hidden gift 205 on the interactive gift drop map 135. At 320, the gift drop logic section 130 makes a determination whether the location in which the one or more symbolic gift items 160 or hidden gifts 205 was dropped overlaps with the gift blocker 215. If YES, then the request is rejected at 325. Otherwise, if NO, then the gift drop logic section 130 drops the one or more symbolic gift items 160 or hidden gift 205 on the interactive gift drop map 135 at 330.

In some embodiments, a computer-implemented method for facilitating geographic enticing gift drops can include receiving, by the gift drop logic section 130, a request to place a geographic gift blocker 215 onto the interactive gift drop map 135. The method can include transmitting a request 142 to the remote gift drop computer server 140 to place the geographic gift blocker 215 onto the authoritative copy of the interactive gift drop map 135. Responsive to the request 142, the method can include receiving a reply 144 from the remote gift drop computer server 140. Responsive to the reply 144 being a confirmation indicating that the geographic gift blocker 215 has been placed onto the authoritative copy of the interactive gift drop map 135, the method can include placing the geographic gift blocker 215 onto the interactive gift drop map 135 presented on the smart mobile device 110.

Subsequently, a user may attempt to place a symbolic gift item 160 in the same area occupied by the geographic gift blocker 215. For example, the method can include transmitting a request 142 to the remote gift drop computer server 140 to drop a symbolic gift item 160 onto the authoritative copy of the interactive gift drop map 135. Responsive to the request 142, the method can include receiving a reply 144 from the remote gift drop computer server 140. Responsive to the reply 144 being a denial indicating that the symbolic gift item 160 has not been placed onto the authoritative copy of the interactive gift drop map 135 due to an overlap with the geographic gift blocker 215, the method can include not dropping the symbolic gift item 160 onto the interactive gift drop map 135 presented on the smart mobile device 110.

Figure 4:
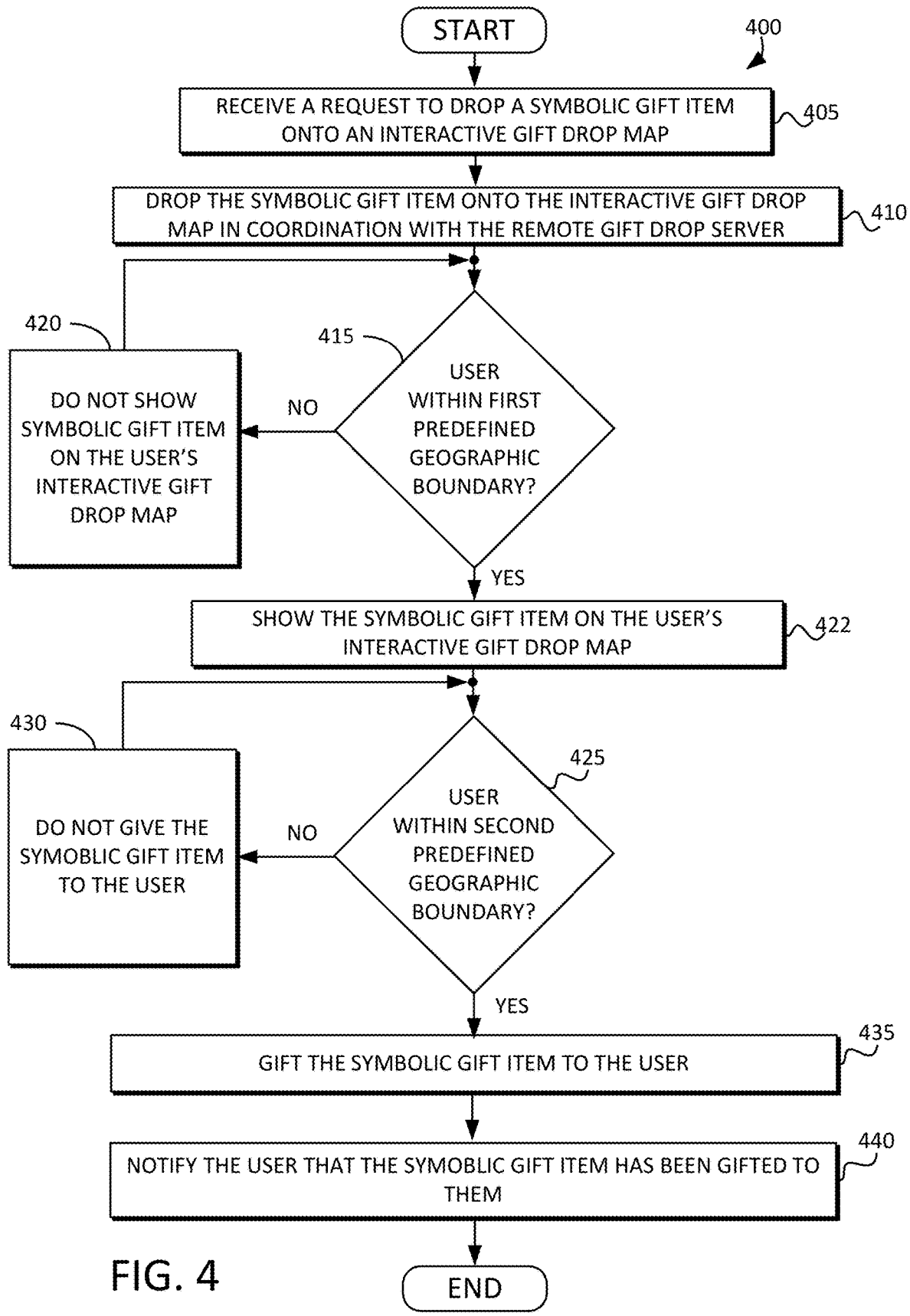
FIG. 4 is a flow diagram illustrating a technique for managing interactive gift drops in accordance with various embodiments of the present inventive concept.

FIG. 4 is a flow diagram 400 illustrating a technique for managing interactive gift drops in accordance with various embodiments of the present inventive concept. The technique can begin at 405 where the gift drop logic section 130 receives a request from a user (e.g., 115, 195, etc.) to place one or more symbolic gift items 160 on the interactive gift drop map 135. At 410, the gift drop logic section 130 drops the one or more symbolic gift items 160 on the interactive gift drop map 135 in coordination with the remote gift drop server 140. For example, the gift drop logic section 130 can transmit a request 142 to the remote gift drop server 140 to place the one or more symbolic gift items 160 at a particular geographic location. The remote gift drop server 140 can transmit a reply 144 that can include a confirmation indicating that one or more symbolic gift items 160 have been placed, or a denial indicating that one or more symbolic gift items 160 have not been placed. In some embodiments, the remote gift drop server 140 can record the location of the one or more symbolic gift items 160 in the gift drop database 155, and track all of the creations and redemptions of the one or more symbolic gift items 160. In other words, the gift drop database 155 can include an authoritative copy of the interactive gift drop map 135 and maintain it as various other smart mobile devices (e.g., 110) personal computers (e.g., 170) and the like send requests for dropping symbolic gift items 160 onto the interactive gift drop map 135.

At 415, the gift drop logic section 130 makes a determination whether a different user (e.g., 115, 195, etc.) is within a first predefined geographic boundary 165. If NO, then the one or more symbolic gift items 160 is not made visible to the different user (e.g., 115, 195, etc.) on the interactive gift drop map 135 as shown at 420. Otherwise, if YES, then the one or more symbolic gift items 160 can be made visible to the different user (e.g., 115, 195, etc.) on the interactive gift drop map 135 as shown at 422. Then, at 425, another determination can be made at 425 whether the different user (e.g., 115, 195, etc.) is within a second predefined geographic boundary 168. If NO, then the one or more symbolic gift items 160 need not be gifted to the different user (e.g., 115, 195, etc.) as shown at 430. Otherwise, if YES, then the one or more symbolic gift items 160 can be gifted, by the gift drop logic section 130 in coordination with the remote gift drop server 140, to the different user (e.g., 115, 195, etc.) at 435. For example, the gift drop logic section 130 of either or both of the smart mobile device logic 120 and the device logic 175 can transmit a request 142 to the remote gift drop server 140. The request 142 can include, for example, a request to gift the one or more symbolic gift items 160 to the different user (e.g., 115, 195, etc.). The remote gift drop server 140 can transmit a reply 144 to the request 142. The reply 144 can include, for example, a confirmation or denial of the requested gifting action. At 440, the gift drop logic section 130 can notify the different user (e.g., 115, 195, etc.) that the one or more symbolic gift items 160 has been gifted to them.

Accordingly, users (e.g., 115, 195, etc.) can be enticed to give and receive gifts because the interactive gift drop map 135 makes it easy and fun. Business users (e.g., 115, 195, etc.) can be enticed to create gift-giving campaigns to promote their products or services.

In some embodiments, the user (e.g., 115, 195, etc.) who drops the one or more symbolic gift items 160 or hidden gifts 205 can indicate that the location is fixed on the interactive gift drop map 135. In an alternate embodiment, the user (e.g., 115, 195, etc.) who drops the one or more symbolic gift items 160 or hidden gifts 205 can indicate that the location moves or changes over time on the interactive gift drop map 135. In some embodiments, the term "drop" can refer to the one or more symbolic gift items 160 or hidden gifts 205 being stuck to or placed on the interactive gift drop map 135. In some embodiments, merchandise can be dropped on the interactive gift drop map 135.

In some embodiments, a computer-implemented method for facilitating geographic enticing gift drops includes presenting an interactive gift drop map 135 on a smart mobile device 110. The method can include receiving, by a gift drop logic section 130 of the smart mobile device 110, a request to drop a symbolic gift item 160 onto the interactive gift drop map 135. The method can include transmitting a request 142 to a remote gift drop computer server 140 to drop the symbolic gift item 160 onto an authoritative copy of the interactive gift drop map 135. The method can include receiving a reply 144 from the remote gift drop computer server 140. Responsive to the reply 144 being a confirmation indicating that the symbolic gift item 160 has been placed onto the authoritative copy of the interactive gift drop map 135, the method can include dropping the symbolic gift item 160 onto the interactive gift drop map 135 presented on the smart mobile device 110.

The method can include determining whether the smart mobile device 110 is within a first predefined geographic boundary 165. Responsive to determining that the smart mobile device 110 is not within the first predefined geographic boundary 165, the method can include not showing the symbolic gift item 160 on the interactive gift drop map 135 presented on the smart mobile device 110. Responsive to determining that the smart mobile device 110 is within the first predefined geographic boundary 165, the method can include showing the symbolic gift item 160 on the interactive gift drop map 135 presented on the smart mobile device 110.

In some embodiments, the method can include determining whether the smart mobile device 110 is within a second predefined geographic boundary 168. Responsive to determining that the smart mobile device 110 is not within the second predefined geographic boundary 168, the method can include not giving the symbolic gift item 160 to a user (e.g., 115) associated with the smart mobile device 110. Conversely, responsive to determining that the smart mobile device 110 is within the second predefined geographic boundary 168, the method can include giving the symbolic gift item 160 to the user 115 associated with the smart mobile device 110. The method can include notifying the user 115 that the symbolic gift item 160 has been gifted to the user 115.

Figure 5:
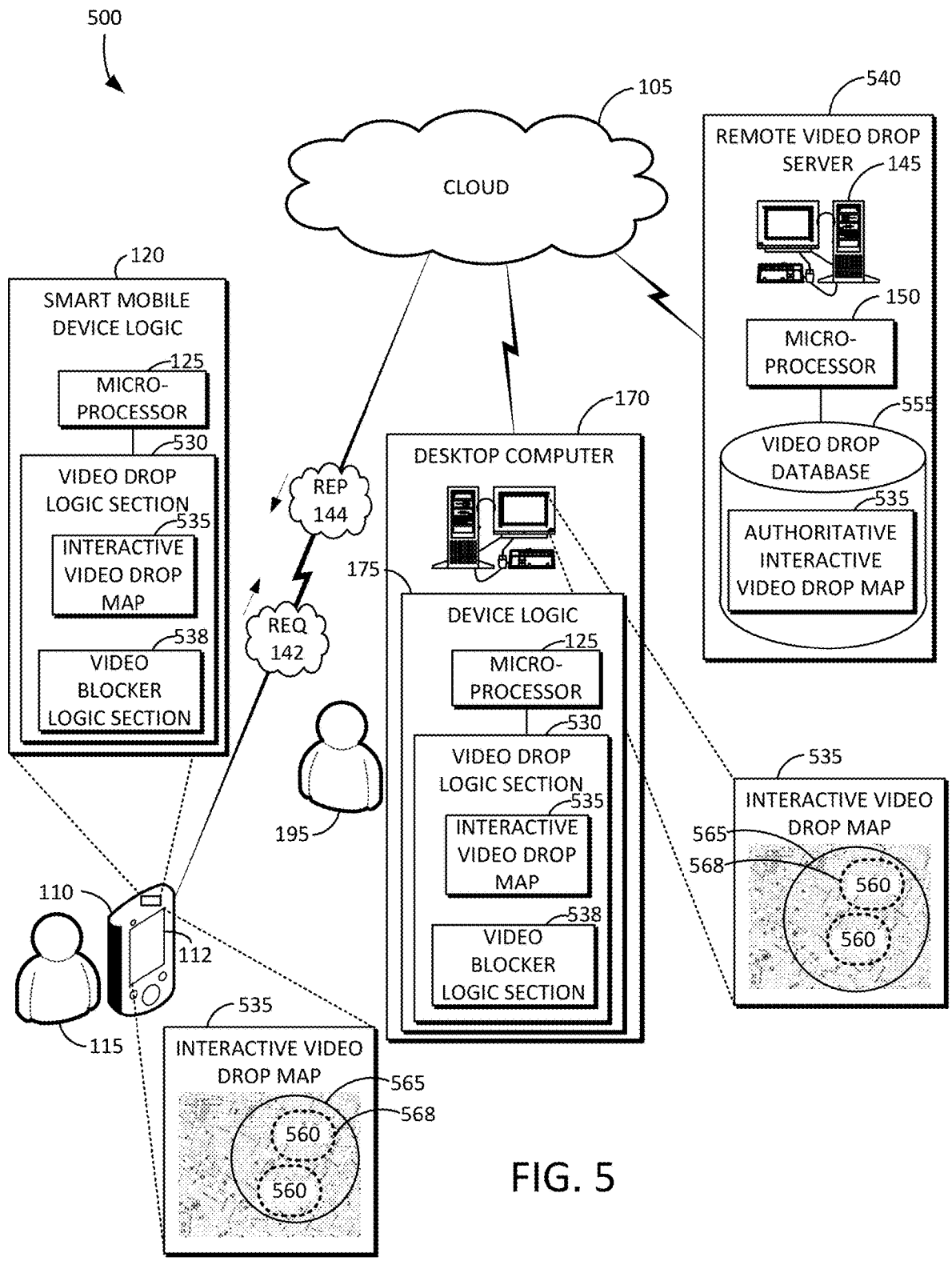
FIG. 5 illustrates a block diagram of an example system including a smart mobile device having a video drop logic section, a desktop computer having a video drop logic section, and a remote video drop server in accordance with various embodiments of the present inventive concept.

FIG. 5 illustrates a block diagram of an example system 500 including a smart mobile device 110 having a video drop logic section 530, a desktop computer 170 having a video drop logic section 530, and a remote video drop server 540 in accordance with various embodiments of the present inventive concept.

The system 500 includes a smart mobile device 110, which can be used by a user 115. The user 115 can be a private individual or a representative of a business. The smart mobile device 110 can be, for example, a smart phone, a smart tablet, a laptop computer, or the like. The smart mobile device 110 can include smart mobile device logic 120. The smart mobile device logic 120 can include a microprocessor 125. Moreover, the smart mobile device logic 120 can include a video drop logic section 530. The video drop logic section 530 can be controlled by or otherwise executed by the microprocessor 125. The video drop logic section 530 can include an interactive video drop map 535, as described in further detail below. In some embodiments, the interactive gift drop map 135 described above and the interactive video drop map 535 described herein are one in the same map, with both gift-drop and video-drop capabilities. The video drop logic section 530 can also include a video blocker logic section 538, which is also described in further detail below.

The system 500 can further include a desktop computer 170, which can be used by a user 195. The user 195 can be a private individual or a representative of a business. The desktop computer 170 can be, for example, a personal computer, a workstation computer, a server, or the like. The desktop computer 170 can include device logic 175. The device logic 175 can include a microprocessor 190. Moreover, the device logic 175 of the desktop computer 170 can include a video drop logic section 530. The video drop logic section 530 can be controlled by or otherwise executed by the microprocessor 190. The video drop logic section 530 can include an interactive video drop map 535, as described in further detail below.

The system 500 can further include a remote video drop server 540. In some embodiments, the remote gift drop server 140 described above and the remote video drop server 540 described herein are one in the same video computer server, with capabilities of supporting both gift-drop and video-drop functions. The smart mobile device 110 can be communicatively coupled to the remote video drop server 540 via the cloud 105. The remote video drop server 540 can include, for example, a computer server 145. The remote video drop server 540 can include a microprocessor 150 and a video drop database 555, as also described in further detail below.

The system 500 facilitates the digital placement of videos, hereinafter referred to as one or more videos 560. For example, the one or more videos 560 can include promotional videos, customer feedback videos, informational videos, entertainment videos, movie videos, or the like. After being placed on the interactive video drop map 535, a location of the video 560 can visibly appear at particular geographic locations on the interactive video drop map 535. For example, a small video icon can appear on the interactive video drop map 535 indicating that a video is available to be played that is associated with the video icon. Alternatively, the location of the video 560 or video icon need not visibly appear on the interactive video drop map 535, but can nevertheless be present but in a hidden state at particular geographic locations on the interactive video drop map 535.

The video 560 can be dropped onto the interactive video drop map 535. For example, a user may select an icon representing a video 560, and with a finger gesture, swipe along the touch-sensitive display 112 of the smart mobile device 110 until the finger is pointing at a place on the interactive video drop map 535 that corresponds to the location to which the video 560 should be geographically positioned on the map. By lifting the finger, the video 560 can be associated with that position, thereby completing the video drop. Using the desktop computer 170, a similar video drop procedure can be carried out using a mouse (not shown) instead of a finger.

In some embodiments, any user (e.g., 115, 195, etc.) can inspect the interactive video drop map 535 and discern the presence of the visible video 560 due to visible video icons indicating location of videos. In some embodiments, a location of a particular video 560 can be made visible to the user 115 only if the user 115 is within a first predefined geographic boundary 565, but otherwise, the location of the particular video 560 can be hidden from view. In some embodiments, the location of the particular video 560 can be made visible to the user 115 even if the user 115 is outside of the first predefined geographic boundary 565.

The user 115 can view the video 560 by selecting the corresponding video icon on the interactive video drop map 535 as long as the user 115 is physically within a second predefined geographic boundary 568. The first predefined geographic boundary 565 is larger than the second predefined geographic boundary 568. For example, the first predefined geographic boundary 565 can have a three (3) mile diameter, while the second predefined geographic boundary 568 can have a fifty (50) foot diameter. Each of the first and second geographic boundaries (565 and 568) can have a shape of a circle, an oval, a square, a rectangle, a triangle, any suitable shape, or the like.

The location of the video 560 can be geographically disassociated with the location of the person or business responsible for dropping the video 560 onto the interactive video drop map 535. Accordingly, the video drops can be anonymous, or otherwise geographically disassociated with the video giver. For example, a business need not drop videos at the actual physical location of the business. Rather, a business can drop videos at ball parks, special events, symposiums, competing locations, or the like.

Alternatively, the location of the video 560 can be geographically associated with the location of the person or business responsible for dropping the video 560 onto the interactive video drop map 535. Accordingly, the video drops need not be anonymous, and can be geographically associated with the business owner. For example, a business can drop videos at the actual physical location of the business.

The video drop logic section 530 of either or both of the smart mobile device logic 120 and the device logic 175 can transmit a request 142 to the remote video drop server 540. The request 142 can include, for example, a request to drop one or more video 560 on to the interactive video drop map. Alternatively, the request 142 can include, for example, a request to create a video blocker, which is discussed in further detail below. The remote video drop server 540 can transmit a reply 144 to the request 142. The reply 144 can include, for example, a confirmation or denial of the requested action.

The visible video drop 560 within the first predefined geographic boundary 565 can be filtered. In other words, if the user 115 wants to limit the quantity or type of videos 560 that are visible on the interactive video drop map 535, then the user 115 can specify criteria for limiting the display of the visible videos 560. For example, a user may specify that only automotive related videos be made visible, or that only food related videos be made visible, and so forth. The video drop logic section 530 can filter the visible video drop 560 responsive to the user's preferences.

By way of another example, a user (e.g., 115, 195, etc.) may drop one or more videos 560 near an underpass of a highway where it is common for homeless individuals to congregate, thereby directly uplifting the lives of others that are in potentially destitute situations, and need an encouraging or informative video to assist them or cheer them up. By way of another example, a user (e.g., 115, 195, etc.) may drop one or more informational videos 560 in an area recently devastated by a natural disaster such as a hurricane or earthquake, thereby bringing helpful information such as relief locations such as tent shelter or water distribution points to those in need.

The video 560 can be moved from one particular location on the interactive video drop map 535 to another particular location by the user who originally placed the video 560. In some embodiments, the user who originally placed the video 560 can select an option to have the video 560 automatically moved from one particular location on the interactive video drop map 535 to another particular location after a certain waiting period. In some embodiments, the user who originally placed the video 560 can select an option to have the video 560 gradually and automatically moved over a predefined period of time from one particular location on the interactive video drop map 535 to another particular location.

In some embodiments, a user (e.g., 195) working on behalf of a business can create an advertising or promotional campaign. For example, a business can setup a promotion such as placing one or more videos 560 at various geographic locations throughout the globe, a city, or even a neighborhood. An existing or new coffee shop can, for example, target a business park and place promotional videos throughout the park. A company such as a vehicle manufacturer or dealer can advertise a promotion where they drop or place a new video at a certain venue at a certain time to promote their product. Users of the interactive video drop map 535 that are located in the crowd will get a notification or invitation if they are the user closest to the virtual drop, and can view the video simply by accepting the invitation. All kinds of offers including video cards, merchandise, food, clothes, shoes, etc., can be promoted in videos at no charge to the recipient. The video drop logic section 530 may charge the company creating the video campaign a fee per virtual video drop, but the end user may view the videos 560 for free.

The individual end users 115 can be limited in distance as to how far away they can see the video 560 and where they are placed. For example, a location of the video 560 can be made visible to the user 115 when the user 115 is physically located within the predefined geographic boundary 565. The predefined geographic boundary 565 can be circular and have a 3 mile diameter, for example. It will be understood that other geographic boundaries and shapes can be used, such as squares, triangles, or rectangles.

In some embodiments, individual end users 115 can place videos 560 on the interactive video drop map 535 anywhere they would like. For example, an individual end user 115 can place one or more uplifting or entertaining videos 560 at a homeless shelter in their hometown, or anywhere in the world. In the event of a natural disaster in a particular place, an individual end user 115 can place one or more informational videos 560 in towns or neighborhoods affected by the disaster.

In some embodiments, individual end users 115 can send a video 560 directly to another person by sending them a link either publicly or anonymously. The system 500 facilitates the digital placement of videos 560 to one or more points on the interactive video drop map 535 with no height restriction.

In some embodiments, the system 500 for facilitating geographic video drops includes a video drop database 555 stored in a remote video drop computer server 540. The video drop database 555 can include an authoritative copy of an interactive video drop map 535. The system 500 can include a video drop logic section 530. The video drop logic section 530 can include the interactive video drop map 535. The video drop logic section 530 can be configured to present the interactive video drop map 535 to a user (e.g., 115) of the smart mobile device 110. The video drop logic section 530 can be configured to detect a gesture from the user on a touch-sensitive display 112 of the smart mobile device 110. The gesture can be, for example, a touch gesture using a finger, a swipe gesture using a finger, a touch-hold-and-move gesture using a finger, a touch gesture using a stylus, a swipe gesture using a stylus, a touch-hold-and-move gesture using a stylus, or the like. Responsive to the gesture, the video drop logic section 530 can be configured to transmit a request 142 to the remote video drop computer server 540 via the cloud 105 to drop a video 560 onto the authoritative copy of the interactive video drop map 535. The video drop logic section 530 can be configured to receive a reply 144 from the remote video drop computer server 540 via the cloud 105. Responsive to the reply 144 being a confirmation indicating that the video 560 has been placed onto the authoritative copy of the interactive video drop map 535, the video drop logic section 530 can be configured to drop the video 560 onto the interactive video drop map 535 presented to the user 115 of the smart mobile device 110. Responsive to the reply 144 being a denial of the request to drop the video onto the interactive video drop map 535, the video drop logic section 530 can be configured to not drop the video 560 onto the interactive video drop map 535 presented to the user 115 of the smart mobile device 110.

In some embodiments, the video drop logic section 530 is further configured to receive a request from a user (e.g., 115) to view the video 560. The video drop logic section 530 can determine whether the user 115 is inside of a predefined geographic boundary 568. Responsive to determining that the user 115 is inside of the predefined geographic boundary 568, the video drop logic section 530 can cause the video 560 to be played for the user 115.

Figure 6:
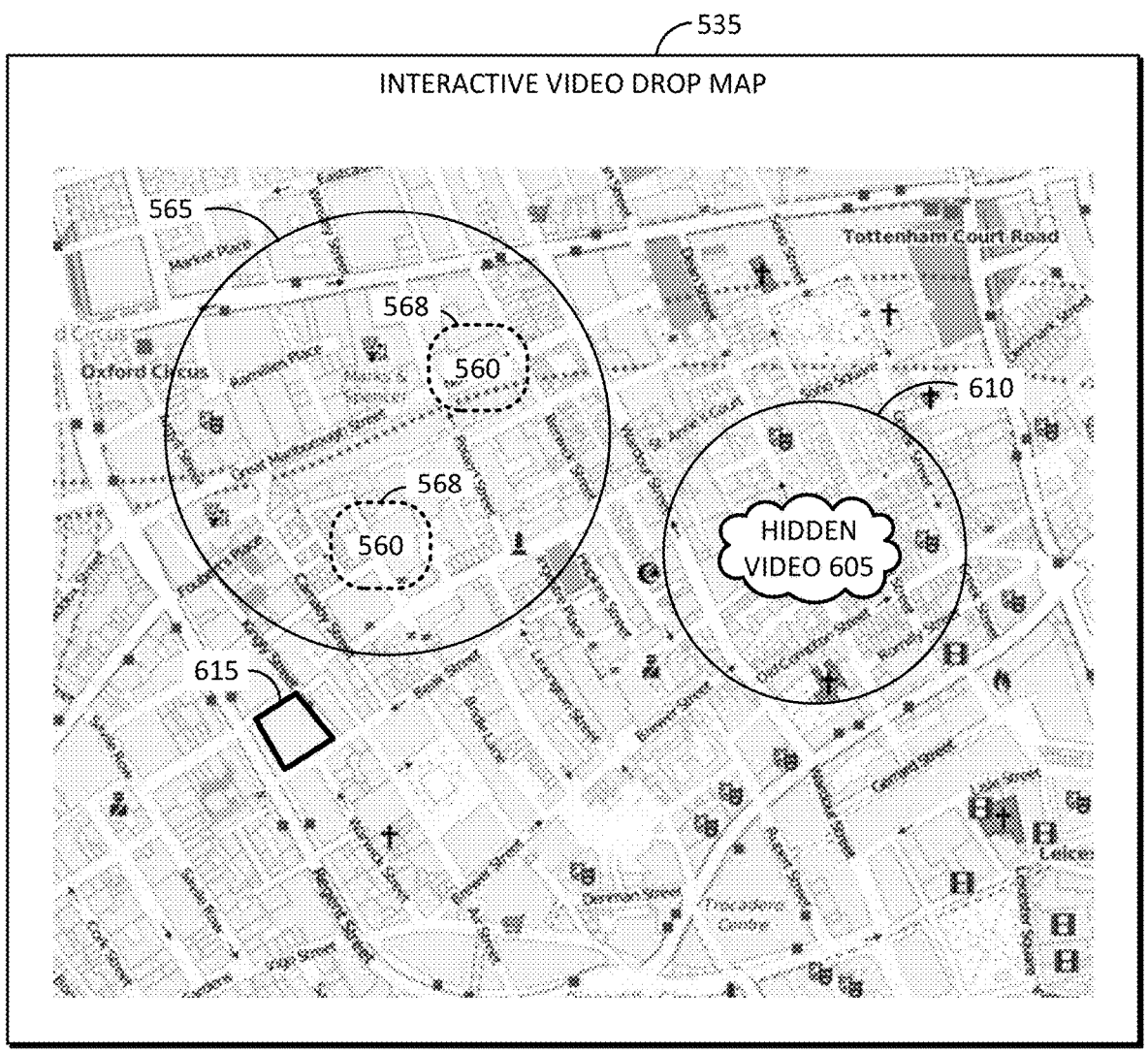
FIG. 6 illustrates a diagram of an interactive video drop map in accordance with various embodiments of the present inventive concept.

FIG. 6 illustrates a diagram of an interactive video drop map 535 in accordance with various embodiments of the present inventive concept. In some embodiments, one or more hidden videos 605 can be hidden on the interactive video drop map 535 and are not initially made publicly visible. The hidden videos 605 are not initially visible to the user 115. However, if the user 115 gets within a predefined proximity 610 of the hidden video 605, then the user 115 can automatically be shown the video 605, which would no longer be made hidden.

The predefined proximity 610 can be set by the user or business who dropped the hidden video 605 onto the interactive video drop map 535. The predefined proximity 610 can be circular, square, rectangle, or any suitable shape. The predefined proximity 610 can be of any suitable geographic size and area. The video drop logic section 530 can be configured to make the video 605 hidden to a user 115 when the user is outside of the predefined geographic boundary 610. The video drop logic section 530 can be configured to make the video 605 visible to the user 115 when the user 115 is inside of the predefined geographic boundary 610.

The video drop logic section 530 can include a video blocker logic section 538. The video blocker logic section 538 permits a business to purchase a geographic video blocker 615, which can block a competitor from dropping video 560 on their physical location. In other words, if the geographic video blocker 615 is purchased, then the video blocker logic section 538 causes all other users (e.g., 115) to be prevented from dropping videos 560 or hidden videos 605 within the geographic video blocker 615. Accordingly, a business who purchases the geographic video blocker 615 can prevent its competitors from interfering with its business or otherwise stealing its customers, while the business itself can display its own videos associated with their own location. In some embodiments, only persons who own or rent a particular physical location can purchase the geographic video blocker 615 for that location.

In some embodiments, the video drop logic section 530 can be configured to receive a request from a user (e.g., 515) to place a geographic video blocker 615 onto the interactive video drop map 535. The video drop logic section 530 can transmit a request 142 to the remote video drop computer server 540 via the cloud 105 to place the geographic video blocker 615 onto the authoritative copy of the interactive video drop map 535. The video drop logic section 530 can receive a reply 144 from the remote video drop computer server 540 via the cloud 105. Responsive to the reply 144 being a confirmation indicating that the geographic video blocker 615 has been placed onto the authoritative copy of the interactive video drop map 535, the video drop logic section 530 can place the geographic video blocker 615 onto the interactive video drop map 535 presented on the smart mobile device 110. The video drop logic section 530 can be configured to transmit a request to the remote video drop computer server 540 via the cloud 105 to drop a video 560 onto the authoritative copy of the interactive video drop map 535. The video drop logic section 530 can receive a reply 144 from the remote video drop computer server 540 via the cloud 105. Responsive to the reply 144 being a denial indicating that the video 560 has not been placed onto the authoritative copy of the interactive video drop map 535 due to an overlap with the geographic video blocker 615, the video drop logic section 530 can be configured to not drop the video 560 onto the interactive video drop map 535 presented on the smart mobile device 110.

Figure 7:
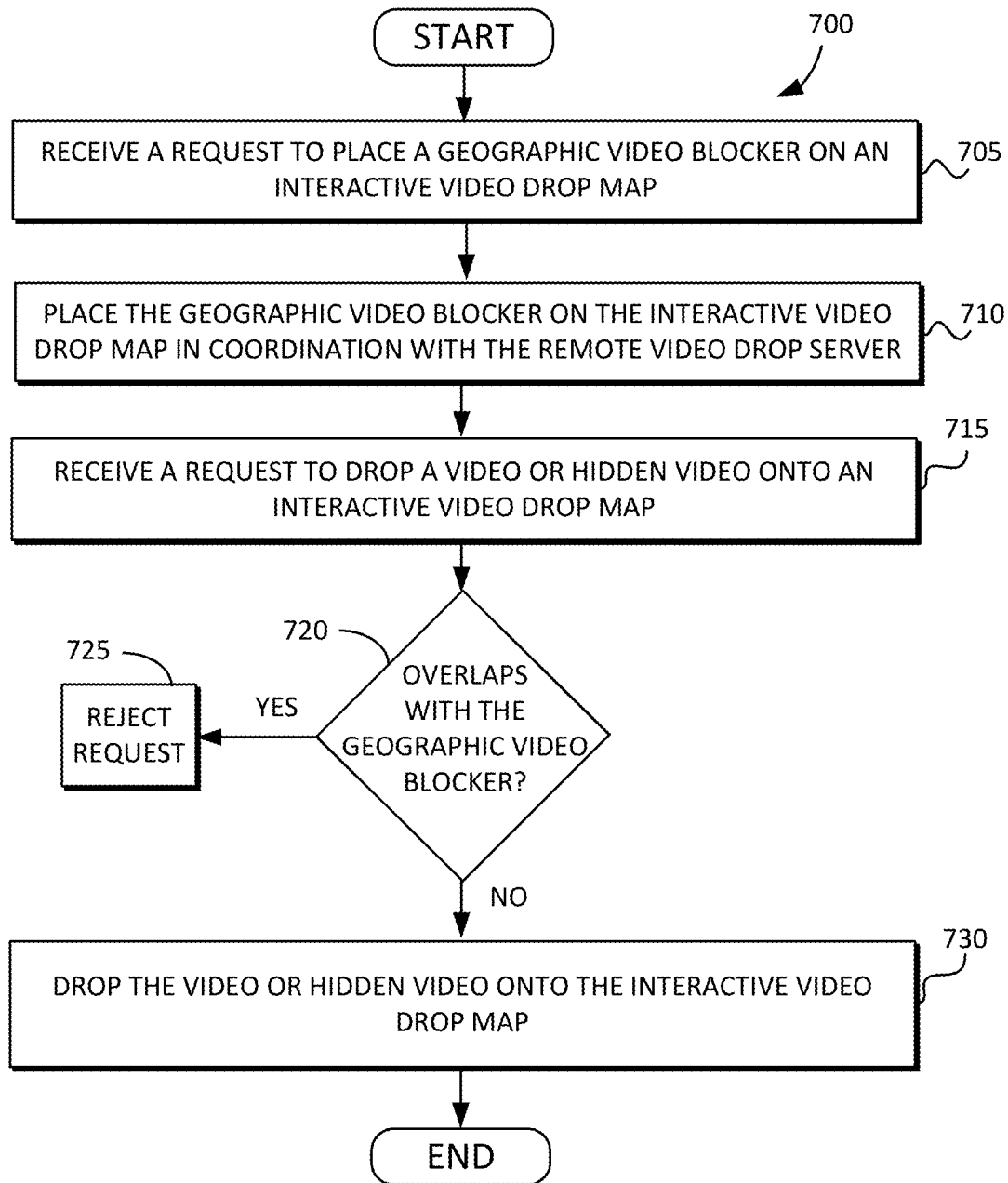
FIG. 7 is a flow diagram illustrating a technique for enforcing fairness of the interactive video drop map in accordance with various embodiments of the present inventive concept.

FIG. 7 is a flow diagram 700 illustrating a technique for enforcing fairness of the interactive video drop map 535 in accordance with various embodiments of the present inventive concept. The technique can begin at 705 where the video drop logic section 530 receives a request from a user (e.g., 115, 195, etc.) to place a geographic video blocker 615 on the interactive video drop map 535. At 710, the video blocker logic section 538 of the video drop logic section 530 can place the geographic video blocker 615 on the interactive video drop map 535 in coordination with the remote video drop server 540. For example, the video blocker logic section 538 of the video drop logic section 530 can transmit a request 142 to the remote video drop server 540 to place the geographic video blocker 615 at a particular geographic location corresponding to a physical location, building, etc. The remote video drop server 540 can transmit a reply 144 that can include a confirmation indicating that the geographic video blocker 615 has been placed, or a denial indicating that the geographic video blocker 615 has not been placed.

At 715, the video drop logic section 530 receives a request from a different user (e.g., 115, 195, etc.) to place a video 560 or hidden video 605 on the interactive video drop map 535. At 720, the video drop logic section 530 makes a determination whether the location in which the video 560 or hidden video 605 was dropped overlaps with the video blocker 615. If YES, then the request is rejected at 725. Otherwise, if NO, then the video drop logic section 530 drops the video 560 or hidden video 605 on the interactive video drop map 535 at 730.

Figure 8:
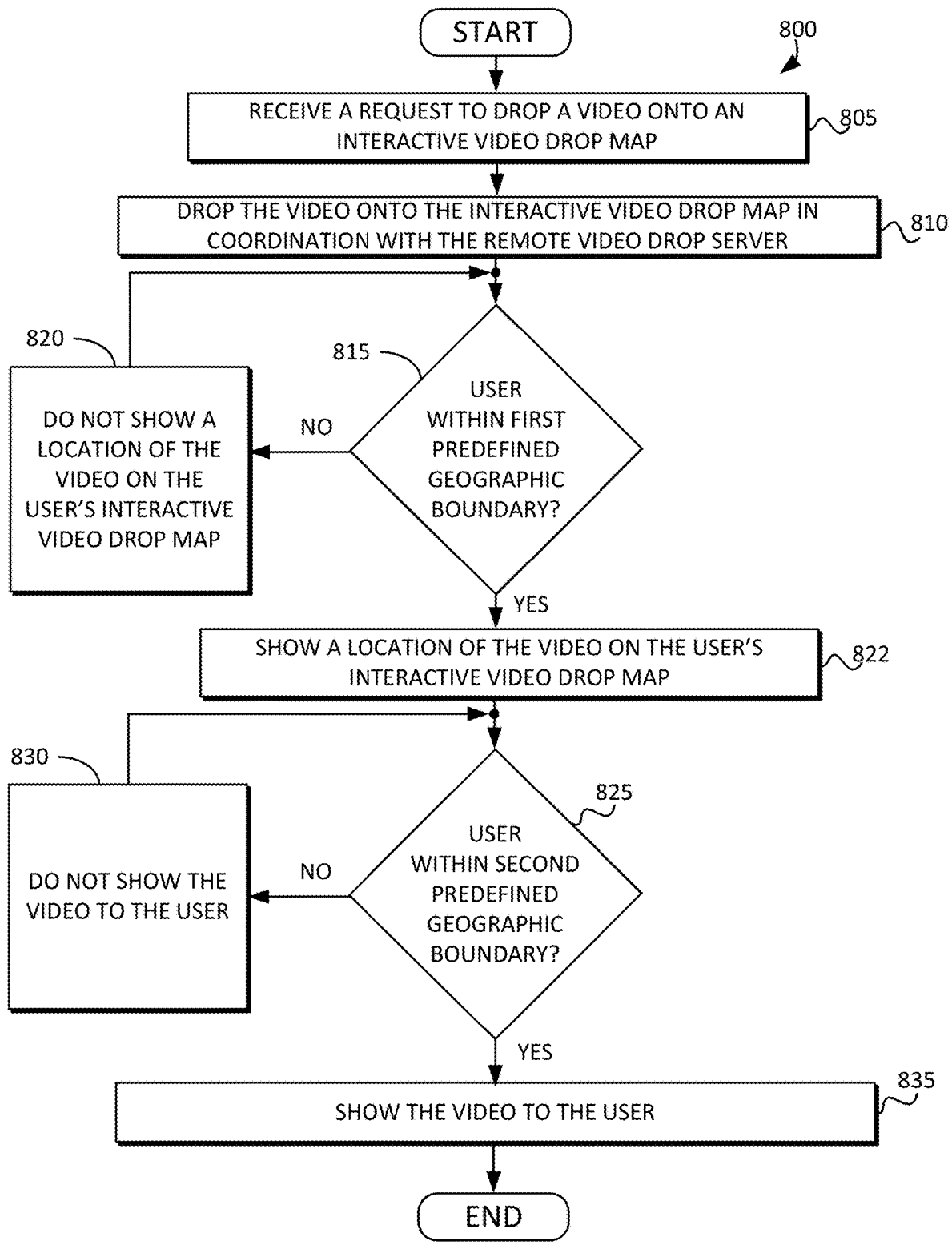
FIG. 8 is a flow diagram illustrating a technique for managing interactive video drops in accordance with various embodiments of the present inventive concept.

FIG. 8 is a flow diagram 800 illustrating a technique for managing interactive video drops in accordance with various embodiments of the present inventive concept. The technique can begin at 805 where the video drop logic section 530 receives a request from a user (e.g., 115, 195, etc.) to place one or more videos 560 on the interactive video drop map 535. At 810, the video drop logic section 530 drops the one or more videos 560 on the interactive video drop map 535 in coordination with the remote video drop server 540. For example, the video drop logic section 530 can transmit a request 142 to the remote video drop server 540 to place the one or more videos 560 at a particular geographic location. The remote video drop server 540 can transmit a reply 144 that can include a confirmation indicating that one or more videos 560 have been placed, or a denial indicating that one or more videos 560 have not been placed. In some embodiments, the remote video drop server 540 can record the location of the video 560 in the video drop database 555, and track all of the video drops and video views of the one or more videos 560. In other words, the video drop database 555 can include an authoritative copy of the interactive video drop map 535 and maintain it as various other smart mobile devices (e.g., 110) personal computers (e.g., 170) and the like send requests for dropping videos 560 onto the interactive video drop map 535.

At 815, the video drop logic section 530 makes a determination whether a different user (e.g., 115, 195, etc.) is within a first predefined geographic boundary 565. If NO, then a location of the video 560 is not made visible to the different user (e.g., 115, 195, etc.) on the interactive video drop map 535 as shown at 820. Otherwise, if YES, then a location of the video 560 can be made visible to the different user (e.g., 115, 195, etc.) on the interactive video drop map 535 as shown at 822. Then, at 825, another determination can be made at 825 whether the different user (e.g., 115, 195, etc.) is within a second predefined geographic boundary 568. If NO, then the video 560 need not be shown to the different user (e.g., 115, 195, etc.) as shown at 830. Otherwise, if YES, then the video 560 can be shown, by the video drop logic section 530 in coordination with the remote video drop server 540, to the different user (e.g., 115, 195, etc.) at 835. For example, the video drop logic section 530 of either or both of the smart mobile device logic 120 and the device logic 175 can transmit a request 142 to the remote video drop server 540. The request 142 can include, for example, a request to view a particular video by the different user (e.g., 115, 195, etc.). The remote video drop server 540 can transmit a reply 144 to the request 142. The reply 144 can include, for example, a confirmation or denial of the requested action, the particular video itself, and/or a stream of the particular video.

Accordingly, users (e.g., 115, 195, etc.) can be enticed to view videos because the interactive video drop map 535 makes it intriguing since videos can be geographically associated or geographically disassociated with particular physical locations. Business users (e.g., 115, 195, etc.) can be enticed to create video campaigns to promote their products or services.

In some embodiments, the user (e.g., 115, 195, etc.) who drops the videos 560 or hidden video 605 can indicate that the location is fixed on the interactive video drop map 535. In an alternate embodiment, the user (e.g., 115, 195, etc.) who drops the videos 560 or hidden video 605 can indicate that the location moves or changes over time on the interactive video drop map 535. In some embodiments, the term "drop" can refer to the videos 560 or hidden video 605 being stuck to or placed on the interactive video drop map 535. In some embodiments, merchandise can be dropped on the interactive video drop map 535.

Figure 9:
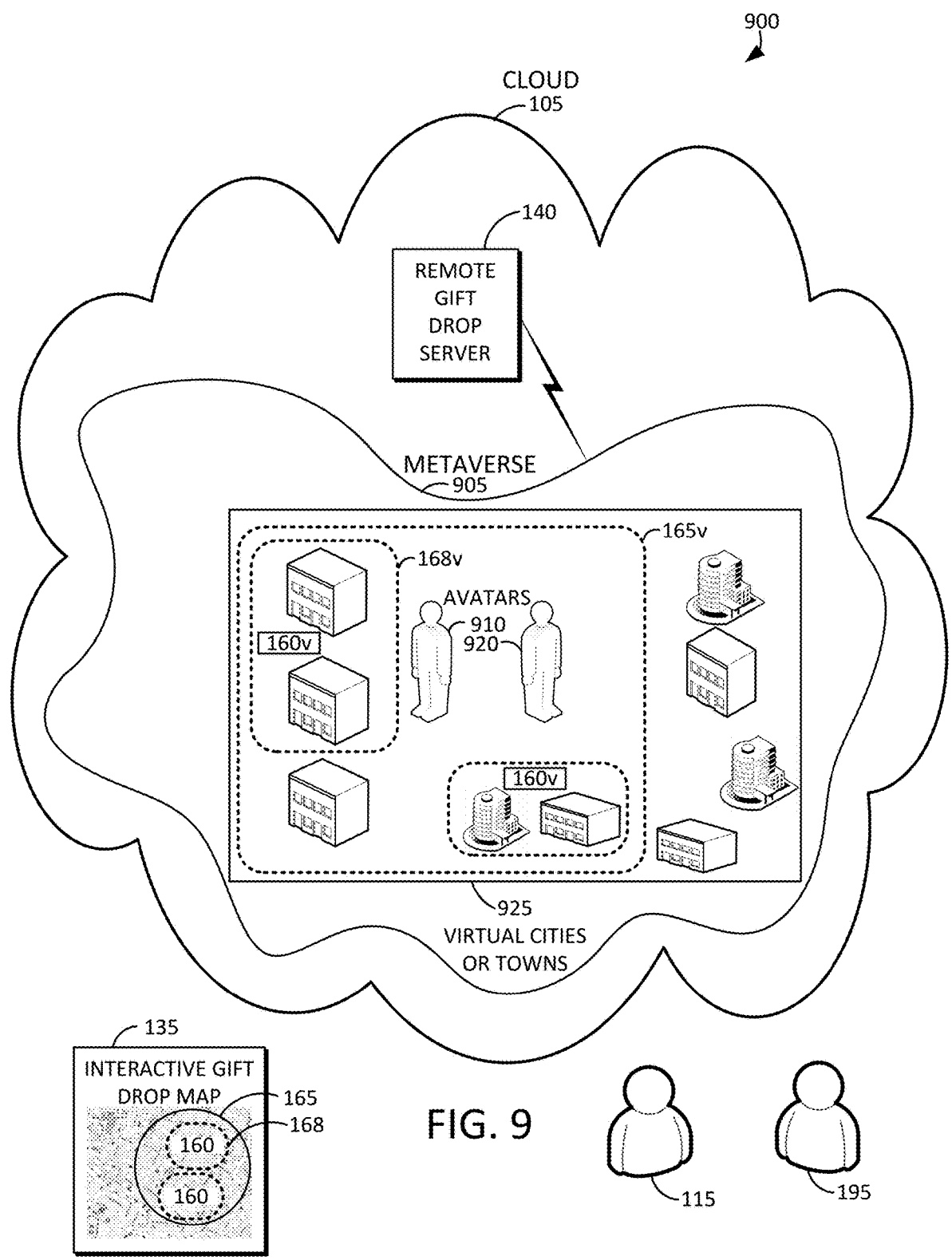
FIG. 9 illustrates a block diagram of an example system including a metaverse having one or more virtual towns or cities, and including symbolic gift items within predefined virtual predefined geographic boundaries in accordance with various embodiments of the present inventive concept.

FIG. 9 illustrates a block diagram of an example system 900 including a metaverse 905 having one or more virtual towns or cities 925, and including symbolic gift items (e.g., 160v) within predefined metaverse geographic boundaries (e.g., 165v, 168v) in accordance with various embodiments of the present inventive concept. Some reference numerals have been described in detail above, and therefore, a detailed description of these is not necessarily repeated.

In some embodiments, the metaverse 905 exists in the cloud 105. It will be understood, however, that the metaverse 905 need not exist in the cloud 105, but rather, can be embodied within a group of computer servers, a neural network, a single computer server, or the like. In some embodiments, the metaverse 905 includes one or more virtual three-dimensional (3D) worlds having the one or more virtual towns or cities 925. In some embodiments, the metaverse 905 includes one or more virtual two-dimensional (2D) worlds having the one or more virtual towns or cities 925. The metaverse 905 can be accessed through a display monitor, a virtual reality headset, headphones, or the like. The metaverse 905 can include one or more avatars (e.g., 910, 920), which can represent one or more actual human users (e.g., 115, 195) within the metaverse 905. The one or more human users (e.g., 115, 195) along with their associated one or more avatars (e.g., 910, 920) can navigate the metaverse 905 using computer devices such as one or more computer monitors, keyboards, computer mice, virtual reality headsets, headphones, microphones, feedback controllers, or the like.

In some embodiments, rather than the interactive gift drop map 135 representing actual geographic areas in the real world, the interactive gift drop map 135 can represent virtual geographic areas within the metaverse 905. The symbolic gift items 160 of the interactive gift drop map 135 can correspond to metaverse symbolic gift items (e.g., 160v) placed within virtual geographic areas within the metaverse 905. The predefined geographic boundary 165 of the interactive gift drop map 135 can correspond to a predefined geographic boundary 165v within the metaverse 905. Similarly, the predefined geographic boundary 168 of the interactive gift drop map 135 can correspond to a predefined geographic boundary 168v within the metaverse 905.

The remote gift drop server 140 can exist in the cloud 105. Alternatively, the remote gift drop server 140 need not exist in the cloud 105, but can communicate via the cloud 105. The system 900 facilitates the digital placement of symbolic gift items 160, having monetary value on the interactive gift drop map 135, and facilitates the corresponding digital placement of metaverse symbolic gift items 160v in the metaverse 905. For example, the symbolic gift items 160 and corresponding metaverse symbolic gift items 160v can include gift cards, coupons, promotional things of value, cash, virtual cash, virtual tokens, crypto tokens, NFTs, or the like. After being placed on the interactive gift drop map 135, the symbolic gift items 160 can visibly appear on the gift drop map 135, and corresponding metaverse symbolic gift items 160v can visibly appear at particular geographic locations within the metaverse 905. In other words, the interactive gift drop map 135 can represent a geographic region within the metaverse 905 rather than a physical geographic region in the real world. Alternatively, the symbolic gift items 160 need not visibly appear on the interactive gift drop map 135, but can nevertheless be present but in a hidden state at particular geographic locations on the interactive gift drop map 135. Accordingly, corresponding metaverse symbolic gift items 160v need not be visible in the metaverse 905, but can nevertheless be present but in a hidden state at particular metaverse geographic locations within the metaverse 905.

The symbolic gift items 160 can be dropped onto the interactive gift drop map 135. This can cause corresponding metaverse symbolic gift items 160v to be inserted into the metaverse 905. For example, a user may select an icon representing a symbolic gift item 160, and with a finger gesture, swipe along the touch-sensitive display 112 (of FIG. 1) of the smart mobile device 110 (of FIG. 1) until the finger is pointing at a place on the interactive gift drop map 135 that corresponds to the location to which the symbolic gift item 160 should be geographically positioned on the map, and correspondingly geographically positioned within the metaverse 905. By lifting the finger, the symbolic gift item 160 can be associated with that position, thereby completing the gift drop. This action also completes the gift drop of a corresponding metaverse symbolic gift item 160v. Using the desktop computer 170 (of FIG. 1), a similar gift drop procedure can be carried out using a mouse (not shown) instead of a finger.

Any user (e.g., 115, 195, etc.) can inspect the interactive gift drop map 135 and discern the presence of the visible symbolic gift items 160. Alternatively or in addition, any user (e.g., 115, 195, etc.) can inspect the metaverse 905 and discern the presence of the visible metaverse symbolic gift items 160v. In some embodiments, a particular metaverse symbolic gift item (e.g., 160v) can be made visible to the user 115 only if the user's avatar (e.g., 910) is within a first predefined metaverse geographic boundary 165v, but otherwise, the particular metaverse symbolic gift item 160v can be hidden from view. In some embodiments, the particular metaverse symbolic gift item (e.g., 160v) can be made visible to the user 115 even if the user's avatar 910 is outside of the first predefined geographic boundary 165v. The user 115 can claim the visible metaverse symbolic gift items 160v by selecting them in the metaverse 905 using their avatar 910, as long as the avatar 910 is physically within a second predefined metaverse geographic boundary (e.g., 168v). The first predefined metaverse geographic boundary 165v is larger than the second predefined metaverse geographic boundary 168v. For example, the first predefined metaverse geographic boundary 165v can have a one (1) mile diameter within the metaverse 905, while the second predefined metaverse geographic boundary 168v can have a fifty (50) foot diameter within the metaverse 905. Each of the first and second geographic boundaries (165v and 168v) can have a shape of a circle, an oval, a square, a rectangle, a triangle, any suitable shape, or the like.

The location of the symbolic metaverse gift item 160v can be geographically disassociated with the location of the person or business responsible for dropping the symbolic gift item 160 onto the interactive gift drop map 135, and/or disassociated with the location of the corresponding avatar (e.g., 910) or corresponding locations within the metaverse 905. Accordingly, the gift drops can be anonymous, or otherwise geographically disassociated with the gift giver. For example, a business need not drop gifts at the actual physical location of the business. Rather, a business can drop gifts at ball parks, special events, symposiums, competing locations, or the like, within the metaverse 905.

Alternatively, the location of the symbolic gift item 160 can be geographically associated with the location of the person or business responsible for dropping the symbolic gift item 160 onto the interactive gift drop map 135, and/or geographically associated with the location of the corresponding avatar (e.g., 910) or corresponding locations within the metaverse 905. Accordingly, the gift drops need not be anonymous, and can be geographically associated with the gift giver. For example, a business can drop gifts at the actual location of the business within the metaverse 905.

Figure 10:
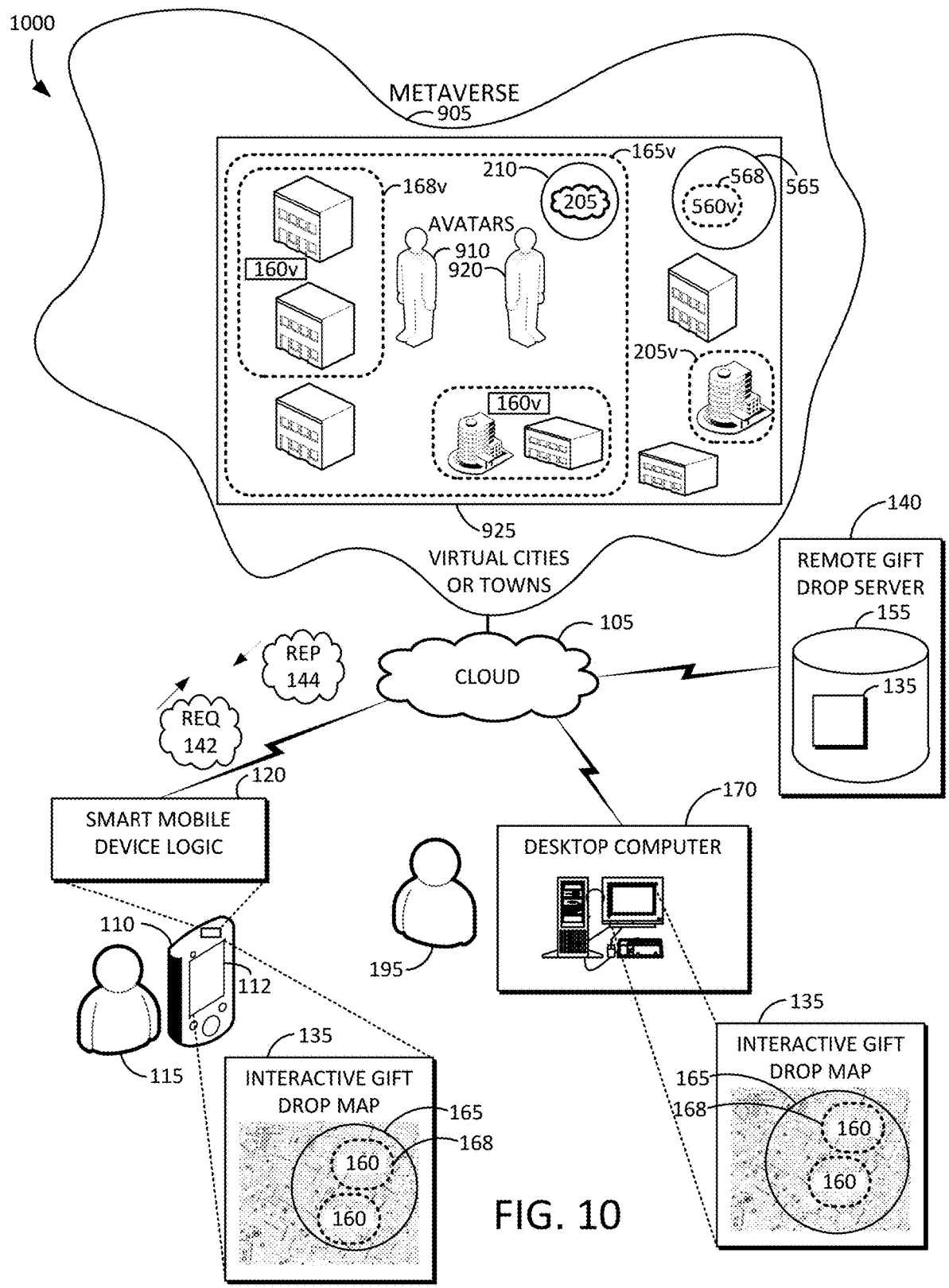
FIG. 10 illustrates a block diagram of an example system including a smart mobile device, a desktop computer, and a remote gift drop server in communication with a metaverse having one or more virtual cities or towns, and including symbolic gift items within predefined virtual predefined geographic boundaries in accordance with various embodiments of the present inventive concept.

FIG. 10 illustrates a block diagram of an example system 1000 including a smart mobile device 110, a desktop computer 170, and a remote gift drop server 140 in communication with a metaverse 905 having one or more virtual cities or towns 925, and including symbolic gift items (e.g., 160v) within predefined metaverse geographic boundaries (e.g., 165v, 168v) in accordance with various embodiments of the present inventive concept. Some reference numerals have been described in detail above, and therefore, a detailed description of these is not necessarily repeated.

The gift drop logic section 130 (of FIG. 1) of either or both of the smart mobile device logic 120 and the device logic 175 (of FIG. 1) can transmit a request 142 to the remote gift drop server 140. The request 142 can include, for example, a request to drop one or more symbolic gift items 160 on to the interactive gift drop map 135, and therefore, one or more corresponding metaverse symbolic gift items 160v into the metaverse 905. Alternatively, the request 142 can include, for example, a request to create a gift blocker (e.g., 215 of FIG. 2, 205v of FIG. 10), which is discussed in detail above. The gift blocker can function in the metaverse 905 in a similar fashion as described elsewhere herein, except that it is applied to block gift drops in a geographic region within a virtual world (e.g., within the metaverse 905) rather than in the physical world. The remote gift drop server 140 can transmit a reply 144 to the request 142. The reply 144 can include, for example, a confirmation or denial of the requested action.

The visible metaverse gift drop items 160v within the first predefined geographic boundary 165v of the metaverse 905 can be filtered. In other words, if the user 115 wants to limit the quantity or type of gift drop items 160 that are visible on the interactive gift drop map 135 and/or within the metaverse 905, then the user 115 can specify criteria for limiting the display of the visible metaverse gift drop items 160v. For example, a user may specify that only automotive related gift items be made visible, or that only food related gift items be made visible, and so forth. The gift drop logic section 130 (of FIG. 1) can filter the visible metaverse gift drop items 160v responsive to the user's preferences.

By way of another example, a user (e.g., 115, 195, etc.) may drop one or more metaverse symbolic gift items 160v near an underpass of a highway (not shown) within the metaverse 905, where it is common for metaverse outcast avatars (e.g., 920) to congregate, thereby directly uplifting the lives of avatars and their associated real-world users (e.g., 195) that are in potentially depressing situations. By way of another example, a user (e.g., 115, 195, etc.) may drop one or more metaverse symbolic gift items 160v in an area near avatar conventions, art exhibits, concerts, or the like, within the metaverse 905.

A metaverse symbolic gift item 160v can be moved from one particular location within the metaverse 905 to another particular location by the user who originally placed the metaverse symbolic gift item 160v. In some embodiments, the user who originally placed the metaverse symbolic gift item 160v can select an option to have the metaverse symbolic gift item 160v automatically moved from one particular location within the metaverse 905 to another particular location after a certain waiting period. In some embodiments, the user who originally placed the metaverse symbolic gift item 160v can select an option to have the metaverse symbolic gift item 160v gradually automatically moved over a predefined period of time from one particular location within the metaverse 905 to another particular location.

In some embodiments, a user (e.g., 195) working on behalf of a business can create an advertising or promotional campaign. For example, a business can setup a promotion such as placing metaverse symbolic gift items 160v at various geographic locations throughout the virtual world, a city, or even a neighborhood within the metaverse 905. An existing or new virtual coffee shop can, for example, target a business park and place free large virtual coffee offers throughout the park within the metaverse 905. The metaverse symbolic gift items such as the free large virtual coffee can, for example, be redeemable in the real world. Thus, business in the real world can benefit from placing metaverse symbolic gift items 160v in the virtual world of the metaverse 905, by attracting new customers to their real-world business. A company such as a vehicle manufacturer or dealer can advertise a promotion where they drop or place a new vehicle free of charge at a certain venue at a certain time within the metaverse 905 to promote their product. The free new vehicle can be a virtual free new vehicle. Alternatively or in addition, the free new vehicle could be redeemable as an actual vehicle in the real world. Avatars (e.g., 910, 920) that are located in the crowd can get a notification if they are the avatar closest to the virtual drop, and can claim the prize simply by accepting the prize or offer.

All kinds of offers including gift cards, merchandise, food, clothes, shoes, etc., can be gifted at no charge to the recipient avatars. The gift drop logic section 130 may charge the company creating the campaign a fee per virtual gift drop, but the avatar and associated end user receives the metaverse symbolic gift item 160v for free. Upon opening the gift, a video associated with the gift can be launched and played for the avatar and/or user. The video can include instructions on how to use or trade the metaverse symbolic gift item 160v, or include other content such as an encouragement to continue searching for other near-by gifts within the metaverse 905.

The avatars (e.g., 910, 920) and therefore associated users (e.g., 115, 195, etc.) can trade metaverse symbolic gift items 160v with other individual avatars and/or end users. The avatars and/or individual end users (e.g., 115, 195, etc.) can be limited in distance as to how far away they can see the metaverse symbolic gift items 160v and where they are placed. For example, the metaverse symbolic gift items 160v can be made visible to the avatar 910 and/or user 115 when the avatar 910 and/or user 115 is physically located within the predefined geographic boundary 165v within the metaverse 905. The predefined geographic boundary 165v can be circular and have a one (1) mile diameter, for example. It will be understood that other geographic boundaries and shapes can be used, such as squares, triangles, rectangles, or other suitable shapes such as polygons, and so forth.

In some embodiments, individual end users 115 can place metaverse symbolic gift items 160v within the metaverse 905 anywhere they would like. For example, an individual end user 115 can place one or more metaverse symbolic gift items 160v at a virtual stadium, or anywhere in the virtual world. In some embodiments, avatars (e.g., 910) and/or individual end users (e.g., 115) can send metaverse symbolic gift items 160v directly to another avatar (e.g., 920) and/or person (e.g., 195) by sending them a link either publicly or anonymously. Individual end users can track all of their transactions via a user interface provided by the gift drop logic section 130 through a display of the smart mobile device 110. In some embodiments, end users 115 can donate metaverse symbolic gift items 160v directly to non-profit organizations, either publicly or anonymously. The gift drop logic section 130 can provide a list of non-profit organizations to which the end user 115 can donate their metaverse symbolic gift items 160v. The system 1000 facilitates the digital placement of metaverse symbolic gift items 160v having real monetary value to one or more points within the metaverse 905 with no height restriction.

In some embodiments, the system 1000 can include a gift drop database 155 stored in the remote gift drop computer server 140. The gift drop database 155 can include an authoritative copy of an interactive gift drop map 135. The system 1000 can include a gift drop logic section 130 (of FIG. 1) operable on the smart mobile device 110. The gift drop logic section 130 can include the interactive gift drop map 135. The gift drop logic section can be configured to present the interactive gift drop map 135 to the user 115 of the smart mobile device 110. The gift drop logic section can be configured to detect a gesture from the user 115 on a touch-sensitive display 112 of the smart mobile device 110. The gesture can be, for example, a touch gesture using a finger, a swipe gesture using a finger, a touch-hold-and-move gesture using a finger, a touch gesture using a stylus, a swipe gesture using a stylus, a touch-hold-and-move gesture using a stylus, or the like.

Responsive to the gesture, the gift drop logic section can be configured to transmit a request 142 to the remote gift drop computer server 140 via the cloud 105 to drop a symbolic gift item 160 onto the authoritative copy of the interactive gift drop map 135. The gift drop logic section 130 can be configured to receive a reply 144 from the remote gift drop computer server 140 via the cloud 105. Responsive to the reply 144 being a confirmation indicating that the symbolic gift item 160 has been placed onto the authoritative copy of the interactive gift drop map 135, the gift drop logic section 130 can be configured to drop the symbolic gift item 160 onto the interactive gift drop map 135 presented to the user 115 of the smart mobile device 110. In addition, the gift drop logic section 130 can be configured to drop a corresponding metaverse symbolic gift item 160v within the metaverse 905 at a location corresponding to the location within the authoritative copy of the interactive gift drop map 135. Conversely, responsive to the reply 144 being a denial of the request to drop the symbolic gift item 160 onto the interactive gift drop map 135, the gift drop logic section 130 can be configured to not drop the symbolic gift item 160 onto the interactive gift drop map 135 presented to the user 115 of the smart mobile device 110. In such case, the gift drop logic section 130 can be configured to also not drop the metaverse symbolic gift item 160v within the metaverse 905.

In some embodiments, the gift drop logic section 130 is further configured to receive a request from a user (e.g., 115) to claim the symbolic gift item 160, and/of from an avatar (e.g., 910) to claim the metaverse symbolic gift item 160v. The gift drop logic section 130 can determine whether the avatar 910 is inside of the second predefined geographic boundary 168v. Responsive to determining that the avatar 910 is inside of the second predefined geographic boundary 168v, the gift drop logic section 130 can gift the metaverse symbolic gift item 160v to the avatar 910, and therefore to the user 115. In some embodiments, the gift drop logic section 130 can cause a video associated with the metaverse symbolic gift item 160v to be launched and played for the avatar and/or the user.

In some embodiments, one or more hidden gifts 205 can be hidden in the metaverse 905 and are not initially made publicly visible. The hidden gifts 205 are not visible to the avatars or the users. However, if the avatar (e.g., 920) gets within a predefined proximity 210 of the hidden gift 205, then the avatar 920 can automatically be gifted the hidden gift 205. This can create a jubilant feeling in the users for having found the hidden gift 205. The hidden gift 205 can be cash or a cash equivalent such as a virtual token that can be redeemed for cash. The gift 205 can be an NFT, which is operable on a blockchain, and/or in association with a blockchain.

By way of yet another example, the virtual token can be a decentralized token such as an Ethereum® token, which can be traded on a decentralized exchange. By way of another example, the virtual token can be a cryptocurrency such as bitcoin. By way of yet another example, the virtual token can be a centralized virtual token. The predefined proximity 210 can be set by the user or business who dropped the hidden gift 205 into the metaverse 905. The predefined proximity 210 can be circular, square, rectangle, or any suitable shape. The predefined proximity 210 can be of any suitable geographic size and area.

The gift drop logic section 130 (of FIG. 1) can include a gift blocker logic section 138 (of FIG. 1). The gift blocker logic section 138 permits a business to purchase a geographic gift blocker 215, which can block a competitor from dropping symbolic gift items 160v on their business location within the metaverse 905. In other words, if the geographic gift blocker 215 is purchased, then the gift blocker logic section 138 causes all other users (e.g., 115) to be prevented from dropping symbolic gift items 160v or hidden gifts 205 within the geographic gift blocker 215. Accordingly, a business who purchases the geographic gift blocker 215 can prevent its competitors from interfering with its business or otherwise stealing its customers. In some embodiments, only persons who own or rent a particular location within the metaverse 905 can purchase the geographic gift blocker 215 for that location.

For example, the gift drop logic section 130 can receive a request from a user (e.g., 115) to place a geographic gift blocker 215 into the metaverse 905. The gift drop logic section 130 can transmit a request 142 to the remote gift drop computer server 140 via the cloud 105 to place the geographic gift blocker 215 onto the authoritative copy of the interactive gift drop map 135. The gift drop logic section 130 can receive a reply 144 from the remote gift drop computer server 140 via the cloud 105.

Responsive to the reply 144 being a confirmation indicating that the geographic gift blocker 215 has been placed onto the authoritative copy of the interactive gift drop map 135, the gift drop logic section 130 can place the geographic gift blocker 215 onto the interactive gift drop map 135 presented on the smart mobile device 110, and onto a corresponding location 215 within the metaverse 905. Conversely, responsive to the reply 144 being a denial of the request 142 to place the geographic gift blocker 215 onto the interactive gift drop map 135, the gift drop logic section 130 can be configured to not place the geographic gift blocker 215 onto the interactive gift drop map 135 presented on the smart mobile device 110, and therefore not place the geographic gift blocker 215 at the corresponding location within the metaverse 905.

In some embodiments, the gift drop logic section 130 is further configured to transmit a second request 142 to the remote gift drop computer server 140 via the cloud 105 to drop a second symbolic gift item 160 onto the authoritative copy of the interactive gift drop map 135, and therefore a corresponding metaverse symbolic gift item 160v into the metaverse 905. The gift drop logic section 130 can receive a reply 144 from the remote gift drop computer server via the cloud. Responsive to the reply 144 being a denial indicating that the symbolic gift item 160 has not been placed onto the authoritative copy of the interactive gift drop map 135 due to an overlap with the geographic gift blocker 215, the gift drop logic section 130 can be configured to not drop the symbolic gift item 160 onto the interactive gift drop map 135 presented on the smart mobile device 110, and therefore, not drop the corresponding metaverse symbolic gift item 160v into the metaverse 905.

In some embodiments, the gift drop logic section 130 is further configured to make the metaverse symbolic gift item 160v hidden to avatars and users when the avatar is outside of the first predefined geographic boundary 165. In some embodiments, the gift drop logic section 130 is further configured to make the metaverse symbolic gift item 160v visible to the avatars and users when the avatar is inside of the first predefined geographic boundary 165. It will be understood that metaverse symbolic gift items (e.g., 160v) can be dropped into the metaverse 905 and used in conjunction within the metaverse 905 in a fashion that is similar to that described above with reference to FIGS. 1 through 4, with the additional features associated with it happening within the metaverse 905 as disclosed herein. It will also be understood that metaverse videos (e.g., 560v) or video icons can be dropped into the metaverse 905 and used in conjunction within the metaverse 905 in a fashion that is similar to that described above with reference to FIGS. 5 through 8, with the additional features associated with it happening within the metaverse 905 as disclosed herein. For example, the first predefined geographic boundary 565 and the second predefined geographic boundary 568 can exist within the metaverse 905, and the various conditions for revealing, hiding, and/or gifting the metaverse videos (e.g., 560v) or video icons can occur within the metaverse 905 as if it occurred in the real world, as disclosed herein. Accordingly, both the metaverse symbolic gift items (e.g., 160v) and the metaverse videos (e.g., 560v), can be provided and used in a fashion that is similar to or the same as the symbolic gift items (e.g., 160) and the videos (e.g., 560), except that they are provided and used within the metaverse 905 rather than the real world as disclosed herein.

Some embodiments disclosed herein include a method for managing interactive gift drops in a metaverse. The method can include determining, by a gift drop logic section of a computer, whether an avatar is within a first predefined geographic boundary within a metaverse. The method can include responsive to determining that the avatar is not within the first predefined geographic boundary within the metaverse, not making visible a metaverse symbolic gift item within the metaverse. The method can include responsive to determining that the avatar is within the first predefined geographic boundary within the metaverse, making visible the metaverse symbolic gift item within the metaverse. The method can include determining, by the gift drop logic section of the computer, whether the avatar is within a second predefined geographic boundary that is contained within the first predefined geographic boundary within the metaverse. The method can include responsive to determining that the avatar is not within the second predefined geographic boundary, not gifting the metaverse symbolic gift item to a user associated with the avatar. The method can include responsive to determining that the avatar is within the second predefined geographic boundary, gifting the metaverse symbolic gift item to the user associated with the avatar.

The method can include notifying the user that the metaverse symbolic gift item has been gifted to the user associated with the avatar. The method can include fixing, by the gift drop logic section of the computer, a location of the metaverse symbolic gift item within the metaverse. The method can include moving, by the gift drop logic section of the computer, a location of the metaverse symbolic gift item over time within the metaverse. The method can include hiding, by the gift drop logic section of the computer, a hidden gift within the metaverse. The method can include initially making the hidden gift not visible to at least one of the avatar or the user. The method can include detecting whether the avatar gets within a predefined proximity of the hidden gift within the metaverse. The method can include in response to detecting that the avatar gets within the predefined proximity of the hidden gift within the metaverse, automatically gifting the hidden gift to the user associated with the avatar.

Some embodiments disclosed herein include a method for managing interactive videos within a metaverse. The method can include determining, by a video drop logic section of a computer, whether an avatar is within a first predefined geographic boundary within a metaverse. The method can include responsive to determining that the avatar is not within the first predefined geographic boundary within the metaverse, not making visible a location of a video within the metaverse. The method can include responsive to determining that the avatar is within the first predefined geographic boundary, making visible the location of the video within the metaverse. The method can include determining, by the video drop logic section of the computer, whether the avatar is within a second predefined geographic boundary that is contained within the first predefined geographic boundary within the metaverse. The method can include responsive to determining that the avatar is not within the second predefined geographic boundary, not showing the video to a user associated with the avatar. The method can include responsive to determining that the smart mobile device is within the second predefined geographic boundary, showing the video to the user associated with the avatar.

The method can include fixing, by the video drop logic section of the computer, the location of the video within the metaverse. The method can include moving, by the video drop logic section of the computer, the location of the video over time within the metaverse.

The method can include hiding, by the video drop logic section of the computer, a hidden video within the metaverse. The method can include initially making the hidden video not visible to at least one of the avatar or the user. The method can include detecting whether the avatar gets within a predefined proximity of the hidden video within the metaverse. The method can include in response to detecting that the avatar gets within the predefined proximity of the hidden video within the metaverse, automatically showing the hidden video to the user associated with the avatar.

Some embodiments disclosed herein include a non-transitory machine-readable medium comprising instructions executable by one or more processors, the instructions comprising instructions to: present, by a gift drop logic section, an interactive gift drop map on a smart mobile device; receive a request to place a metaverse geographic gift blocker within a metaverse; transmit the request to a remote gift drop computer server to place the metaverse geographic gift blocker within the metaverse; receive a reply from the remote gift drop computer server; and responsive to the reply, place the metaverse geographic gift blocker onto the interactive gift drop map presented on the smart mobile device; and place the metaverse geographic gift blocker within the metaverse.

The instructions can further comprise instructions to: detect a gesture on a touch-sensitive display of the smart mobile device; responsive to the gesture, transmit a request to the remote gift drop computer server to drop a metaverse symbolic gift item onto the interactive gift drop map and into the metaverse; receive a reply from the remote gift drop computer server; and responsive to the reply, drop the metaverse symbolic gift item onto the interactive gift drop map presented on the smart mobile device, and into the metaverse.

The instructions can further comprise instructions to: responsive to the reply being a confirmation indicating that the metaverse symbolic gift item has been placed onto an authoritative copy of the interactive gift drop map, drop the metaverse symbolic gift item onto the interactive gift drop map presented on the smart mobile device, and into the metaverse. The instructions can further comprise instructions to: responsive to the reply being a denial of the request to drop the metaverse symbolic gift item onto the interactive gift drop map, not drop the metaverse symbolic gift item onto the interactive gift drop map presented on the smart mobile device, and not dropping the metaverse symbolic gift item into the metaverse.

The instructions can further comprise instructions to: make the metaverse symbolic gift item hidden when an avatar is outside of a first predefined geographic boundary within the metaverse; and make the metaverse symbolic gift item visible on the interactive gift drop map presented on the smart mobile device, and within the metaverse, when the avatar is inside of the first predefined geographic boundary.

The instructions can further comprise instructions to: receive a request to claim the metaverse symbolic gift item; determine whether the avatar is inside of a second predefined geographic boundary within the metaverse; and responsive to determining that the avatar is inside of the second predefined geographic boundary, gift the metaverse symbolic gift item to a user associated with the avatar.

The instructions can further comprise instructions to cause a video associated with the metaverse symbolic gift item to be launched and played for the avatar and/or the user. The instructions can further comprise instructions to responsive to the reply from the remote gift drop computer server being a confirmation indicating that the metaverse geographic gift blocker is permitted to be placed onto the interactive gift drop map and into the metaverse, place the geographic gift blocker onto the interactive gift drop map presented on the smart mobile device, and into the metaverse at a corresponding location.

The instructions can further comprise instructions to: responsive to the reply from the remote gift drop computer server being a confirmation indicating that the metaverse geographic gift blocker has been placed onto an authoritative copy of the interactive gift drop map, place the metaverse geographic gift blocker onto the interactive gift drop map presented on the smart mobile device, and into the metaverse at a corresponding location.

The instructions can further comprise instructions to: responsive to the reply being a denial of the request to place the metaverse geographic gift blocker onto the interactive gift drop map and into the metaverse, not place the geographic gift blocker onto the interactive gift drop map presented on the smart mobile device, nor into the metaverse.

Some embodiments disclosed herein include a method comprising presenting, by a gift drop logic section, an interactive gift drop map on a smart mobile device. The method can include receiving, by the gift drop logic section, a request to place a metaverse geographic gift blocker onto the interactive gift drop map and into the metaverse. The method can include transmitting a request to a remote gift drop computer server to place the metaverse geographic gift blocker onto the interactive gift drop map, and into the metaverse. The method can include responsive to the request, receiving a reply from the remote gift drop computer server. The method can include responsive to the reply, placing the metaverse geographic gift blocker onto the interactive gift drop map presented on the smart mobile device, and into the metaverse at a corresponding location.

The method can include receiving, by the gift drop logic section, a request to drop a symbolic gift item onto the interactive gift drop map, and into the metaverse at a corresponding location. The method can include transmitting a request to the remote gift drop computer server to drop the symbolic gift item onto the interactive gift drop map, and into the metaverse at a corresponding location. The method can include receiving a reply from the remote gift drop computer server. The method can include responsive to the reply, dropping the metaverse symbolic gift item onto the interactive gift drop map presented on the smart mobile device, and into the metaverse at a corresponding location.

The method can include determining whether the avatar is within a first predefined geographic boundary within the metaverse. The method can include responsive to determining that the avatar is not within the first predefined geographic boundary, not showing the metaverse symbolic gift item on the interactive gift drop map presented on the smart mobile device, nor within the metaverse. The method can include responsive to determining that the avatar is within the first predefined geographic boundary, showing the metaverse symbolic gift item on the interactive gift drop map presented on the smart mobile device, and within the metaverse at a corresponding location.

The method can include determining whether the avatar is within a second predefined geographic boundary within the metaverse. The method can include responsive to determining that the smart mobile device is not within the second predefined geographic boundary, not giving the metaverse symbolic gift item to a user associated with the avatar.

The method can include responsive to determining that the avatar is within the second predefined geographic boundary within the metaverse, giving the symbolic gift item to the user associated with the avatar. The method can include notifying the user that the symbolic gift item has been gifted to the user.

In some embodiments, placing further comprises, responsive to the reply being a confirmation indicating that the metaverse geographic gift blocker has been placed onto an authoritative copy of the interactive gift drop map, placing the metaverse geographic gift blocker onto the interactive gift drop map presented on the smart mobile device, and into the metaverse at a corresponding location.

Some embodiments disclosed herein include a system for facilitating geographic metaverse video drops. The system can include a video drop database stored in a remote video drop computer server, wherein the video drop database includes an authoritative copy of an interactive video drop map. The system can include a video drop logic section operable on a smart mobile device, wherein the video drop logic section includes the interactive video drop map, and wherein the video drop logic section is configured to: receive a request to place a metaverse geographic video blocker onto the interactive video drop map, and into the metaverse at a corresponding location. The video drop logic section can further be configured to: transmit a request to the remote video drop computer server to place the metaverse geographic video blocker onto the authoritative copy of the interactive video drop map, and into the metaverse at a corresponding location. The video drop logic section can further be configured to: receive a reply from the remote video drop computer server; and responsive to the reply, place the metaverse geographic video blocker onto the interactive video drop map presented on the smart mobile device, and into the metaverse at a corresponding location.

In some embodiments, the video drop logic section is configured to: present the interactive video drop map on the smart mobile device; detect a gesture from a user on a touch-sensitive display of the smart mobile device; responsive to the gesture, transmit a request to the remote video drop computer server to drop a metaverse video onto the authoritative copy of the interactive video drop map; receive a reply from the remote video drop computer server; and responsive to the reply, drop the metaverse video onto the interactive video drop map presented to the user of the smart mobile device, and into the metaverse at a corresponding location.

In some embodiments, the video drop logic section is configured to: responsive to the reply being a confirmation indicating that the metaverse geographic video blocker has been placed onto the authoritative copy of the interactive video drop map, place the metaverse geographic video blocker onto the interactive video drop map presented on the smart mobile device, and into the metaverse at a corresponding location.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner.

And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A non-transitory machine-readable medium comprising instructions executable by one or more processors, the instructions comprising instructions to:
   receive a request to place a geographic gift blocker onto an interactive gift drop map;
   transmit the request to a remote gift drop computer server to place the geographic gift blocker onto the interactive gift drop map;
   receive a reply from the remote gift drop computer server; and
   responsive to the reply, place the geographic gift blocker onto a corresponding location within a metaverse.

2. The non-transitory machine-readable medium comprising instructions executable by one or more processors of claim 1, the instructions further comprising instructions to:
   detect a gesture on a touch-sensitive display of a smart mobile device;
   responsive to the gesture, transmit a request to the remote gift drop computer server to drop a symbolic gift item onto the interactive gift drop map;
   receive a reply from the remote gift drop computer server; and
   responsive to the reply, at least one of i) drop a corresponding metaverse symbolic gift item within the metaverse, or ii) drop the corresponding metaverse symbolic gift item into the metaverse.

3. The non-transitory machine-readable medium comprising instructions executable by one or more processors of claim 2, the instructions further comprising instructions to:
   responsive to the reply being a confirmation indicating that the symbolic gift item has been placed onto the interactive gift drop map, at least one of i) drop the corresponding metaverse symbolic gift item within the metaverse, or ii) drop the corresponding metaverse symbolic gift item into the metaverse.

4. The non-transitory machine-readable medium comprising instructions executable by one or more processors of claim 2, the instructions further comprising instructions to:
   responsive to the reply being a denial of the request to drop the symbolic gift item onto the interactive gift drop map, at least one of i) not drop the corresponding metaverse symbolic gift item within the metaverse, or ii) not drop the corresponding metaverse symbolic gift item into the metaverse.

5. The non-transitory machine-readable medium comprising instructions executable by one or more processors of claim 2, the instructions further comprising instructions to:
   make the metaverse symbolic gift item hidden to an avatar when the avatar is outside of a first predefined geographic boundary; and
   make the metaverse symbolic gift item visible to the avatar when the avatar is inside of the first predefined geographic boundary.

6. The non-transitory machine-readable medium comprising instructions executable by one or more processors of claim 5, wherein the avatar represents a human user.

7. The non-transitory machine-readable medium comprising instructions executable by one or more processors of claim 5, the instructions further comprising instructions to:
   receive a request to claim the metaverse symbolic gift item;
   determine whether the avatar is inside of a second predefined geographic boundary; and
   responsive to determining that the avatar is inside of the second predefined geographic boundary, gift the metaverse symbolic gift item to the avatar.

8. The non-transitory machine-readable medium comprising instructions executable by one or more processors of claim 2, the instructions further comprising instructions to:
   cause a video associated with the metaverse symbolic gift item to be launched and played for an avatar within the metaverse.

9. The non-transitory machine-readable medium comprising instructions executable by one or more processors of claim 1, the instructions further comprising instructions to:
   responsive to the reply from the remote gift drop computer server being a confirmation indicating that the geographic gift blocker is permitted to be placed onto the interactive gift drop map, place the geographic gift blocker onto the corresponding location within the metaverse.

10. The non-transitory machine-readable medium comprising instructions executable by one or more processors of claim 9, the instructions further comprising instructions to:
    responsive to the reply being a denial of the request to place the geographic gift blocker onto the interactive gift drop map, not place the geographic gift blocker onto the corresponding location within the metaverse.

11. A computer-implemented method, comprising:
    receiving, by a gift drop logic section, a request to place a geographic gift blocker onto an interactive gift drop map;
    transmitting the request to a remote gift drop computer server to place the geographic gift blocker onto the interactive gift drop map;
    responsive to the request, receiving a reply from the remote gift drop computer server; and
    responsive to the reply, placing the geographic gift blocker onto a corresponding location within a metaverse.

12. The method of claim 11, further comprising:
    receiving, by the gift drop logic section, a request to drop a symbolic gift item onto the interactive gift drop map;
    transmitting a request to the remote gift drop computer server to drop the symbolic gift item onto the interactive gift drop map;
    receiving a reply from the remote gift drop computer server; and
    responsive to the reply, at least one of i) dropping a corresponding metaverse symbolic gift item within the metaverse, or ii) dropping the corresponding metaverse symbolic gift item into the metaverse.

13. The method of claim 12, further comprising:
determining whether an avatar is within a first predefined geographic boundary;
responsive to determining that the avatar is not within the first predefined geographic boundary, not showing the metaverse symbolic gift item within the metaverse; and
responsive to determining that the avatar is within the first predefined geographic boundary, showing the metaverse symbolic gift item within the metaverse.

14. The method of claim 13, further comprising:
determining whether the avatar is within a second predefined geographic boundary;
responsive to determining that the avatar is not within the second predefined geographic boundary, not giving the metaverse symbolic gift item to the avatar; and
responsive to determining that the avatar is within the second predefined geographic boundary, giving the metaverse symbolic gift item to the avatar.

15. The method of claim 14, further comprising notifying the avatar that the metaverse symbolic gift item has been gifted to the avatar.

16. The method of claim 11, wherein placing further comprises, responsive to the reply being a confirmation indicating that the geographic gift blocker has been placed onto the interactive gift drop map, placing the geographic gift blocker onto the corresponding location within the metaverse.

17. A system, comprising:
a video drop database stored in a remote video drop computer server, wherein the video drop database includes an interactive video drop map;
a video drop logic section, wherein the video drop logic section includes the interactive video drop map, and wherein the video drop logic section is configured to:
receive a request to place a geographic video blocker onto the interactive video drop map;
transmit a request to the remote video drop computer server to place the geographic video blocker onto the interactive video drop map;
receive a reply from the remote video drop computer server; and
responsive to the reply, place the geographic video blocker onto a corresponding location within a metaverse.

18. The system of claim 17, wherein the video drop logic section is configured to:
detect a gesture from a user on a touch-sensitive display of a smart mobile device;
responsive to the gesture, transmit a request to the remote video drop computer server to drop a video onto the interactive video drop map;
receive a reply from the remote video drop computer server; and
responsive to the reply, at least one of i) drop the video within the metaverse, or ii) drop the video into the metaverse.

19. The system of claim 17, wherein the video drop logic section is configured to:
responsive to the reply being a confirmation indicating that the geographic video blocker has been placed onto the interactive video drop map, place the geographic video blocker onto the corresponding location within the metaverse.

* * * * *